United States Patent
Elmieh et al.

(10) Patent No.: US 9,792,718 B2
(45) Date of Patent: Oct. 17, 2017

(54) MAPPING GRAPHICS INSTRUCTIONS TO ASSOCIATED GRAPHICS DATA DURING PERFORMANCE ANALYSIS

(75) Inventors: Baback Elmieh, Encinitas, CA (US); James P. Ritts, San Diego, CA (US); Angus Dorbie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1976 days.

(21) Appl. No.: 12/507,756

(22) Filed: Jul. 22, 2009

(65) Prior Publication Data
US 2010/0020098 A1      Jan. 28, 2010

Related U.S. Application Data

(60) Provisional application No. 61/083,665, filed on Jul. 25, 2008.

(51) Int. Cl.
*G06T 15/00* (2011.01)

(52) U.S. Cl.
CPC .................................. *G06T 15/00* (2013.01)

(58) Field of Classification Search
None
See application file for complete search history.

(56) References Cited

U.S. PATENT DOCUMENTS 5,701,405 A   12/1997   Kelley et al.
5,706,479 A   1/1998    Winner et al.
(Continued)

FOREIGN PATENT DOCUMENTS

CN   1270366 A   10/2000
CN   1957377 A   5/2007
(Continued)

OTHER PUBLICATIONS

Asai, E. et. al.: "Web/DVD-Based Multimedia Architecture Simulator," 31st Annual Frontiers in Education Conference. Impact on Engineering and Science Education. Conference Proceedings (Cat. No. 01CH37193), vol. 1, Oct. 10, 2001, pp. T3F-14 to T3F-19, XP002567391 ISBN: 0-7803-6669-7, Abstract; section III. Simulators; Figures 1-6 on pp. T3F-16 to T3F-1; section IV Conclusions.
(Continued)

*Primary Examiner* — Aaron M Richer

(57) ABSTRACT

In general, this disclosure relates to techniques for optimizing a graphics scene, such as a three-dimensional (3D) scene, by allowing application developers and/or graphics artists to identify which graphics instructions and associated graphics data (e.g., polygonal data, texture data) may be associated with identified performance issues. One example method comprises receiving mapping information from the external device, wherein the mapping information includes information to map the graphics instructions to primitive graphics data that is used to render one or more graphics images during execution of the graphics instructions, and identifying a performance issue associated with execution of at least one graphics instruction within the graphics instructions. The method further comprises using the mapping information to identify a portion of the primitive graphics data that is associated with the performance issue based upon execution of the at least one graphics instruction.

56 Claims, 12 Drawing Sheets

(56) References Cited

U.S. PATENT DOCUMENTS

| | | | |
|---|---|---|---|
| 5,760,778 A | | 6/1998 | Friedman |
| 5,889,994 A | | 3/1999 | Brown et al. |
| H1812 H | | 11/1999 | Arcuri |
| 6,091,422 A | * | 7/2000 | Ouaknine et al. ............ 345/419 |
| 6,145,099 A | | 11/2000 | Shindou |
| 6,763,377 B1 | | 7/2004 | Belknap et al. |
| 7,095,146 B2 | | 8/2006 | Fukazawa et al. |
| 7,095,416 B1 | * | 8/2006 | Johns et al. .................. 345/522 |
| 7,167,171 B2 | | 1/2007 | Heim et al. |
| 7,478,187 B2 | | 1/2009 | Knepper et al. |
| 7,623,892 B2 | | 11/2009 | Hawkins |
| 8,296,738 B1 | * | 10/2012 | Kiel et al. ..................... 717/127 |
| 2002/0093520 A1 | | 7/2002 | Larson |
| 2003/0156131 A1 | | 8/2003 | Khazaka |
| 2003/0198377 A1 | | 10/2003 | Ng |
| 2004/0027377 A1 | | 2/2004 | Hays et al. |
| 2005/0018901 A1 | | 1/2005 | Kaufmann et al. |
| 2005/0244040 A1 | | 11/2005 | Li et al. |
| 2006/0109240 A1 | | 5/2006 | Fu et al. |
| 2008/0007563 A1 | | 1/2008 | Aronson et al. |
| 2008/0120543 A1 | * | 5/2008 | Cahill et al. .................. 715/700 |
| 2009/0089714 A1 | | 4/2009 | Blake et al. |
| 2009/0097757 A1 | | 4/2009 | Wimsatt |
| 2010/0020069 A1 | | 1/2010 | Elmieh et al. |
| 2010/0020087 A1 | | 1/2010 | Elmieh et al. |

FOREIGN PATENT DOCUMENTS

| | | |
|---|---|---|
| CN | 101046890 A | 10/2007 |
| JP | 10111815 A | 4/1998 |
| JP | 10275248 A | 10/1998 |
| JP | 2000020354 A | 1/2000 |
| JP | 2001191274 A | 7/2001 |
| JP | 2008500625 A | 1/2008 |
| WO | WO2005031640 | 4/2005 |
| WO | WO2005116930 | 12/2005 |
| WO | WO2007002952 | 1/2007 |
| WO | WO2008024940 | 2/2008 |

OTHER PUBLICATIONS

Bender, K. et. al.: "Introduction to the Performance Analyzer for PlayStation 2" Game Developers Conference 2003, Mar. 18, 2003, pp. 1-57, XP002567390, pp. 3-6 and pp. 10-11.

Lukashev, D. et. al.: "3D Applications for 3G Mobile Phones: Design, Development, Resource Utilization," Consumer Electronics, 2006. ISCE '06. 2006 IEEE Tenth International Symposium on St. Petersburg, Russia 28-01 Jun. 2006, Piscataway, NJ, USA, IEEE, Jun. 28, 2006, pp. 159-162, XP002465725, ISBN: 978-1-4244-0216-8 the whole document.

Paul, B. "TR—OpenGL Tile Rendering Library," Aug. 25, 2005, Version 1.3, pp. 1-9.

Sony Ericsson, "Mobile 3D Graphics and Java Applications Development for Sony Ericsson Phones," Nov. 30, 2004, pp. 1-32, XP002567374, Paragraph 3.4 on p. 10; Figures 1,3,4,5 on pp. 19-25.

International Search Report &Written Report—PCT/US09/051773, International Search Authority—European Patent Office—dated Dec. 7, 2009.

Taiwan Search Report—TW098125260—TIPO—dated Nov. 2, 2012.

* cited by examiner

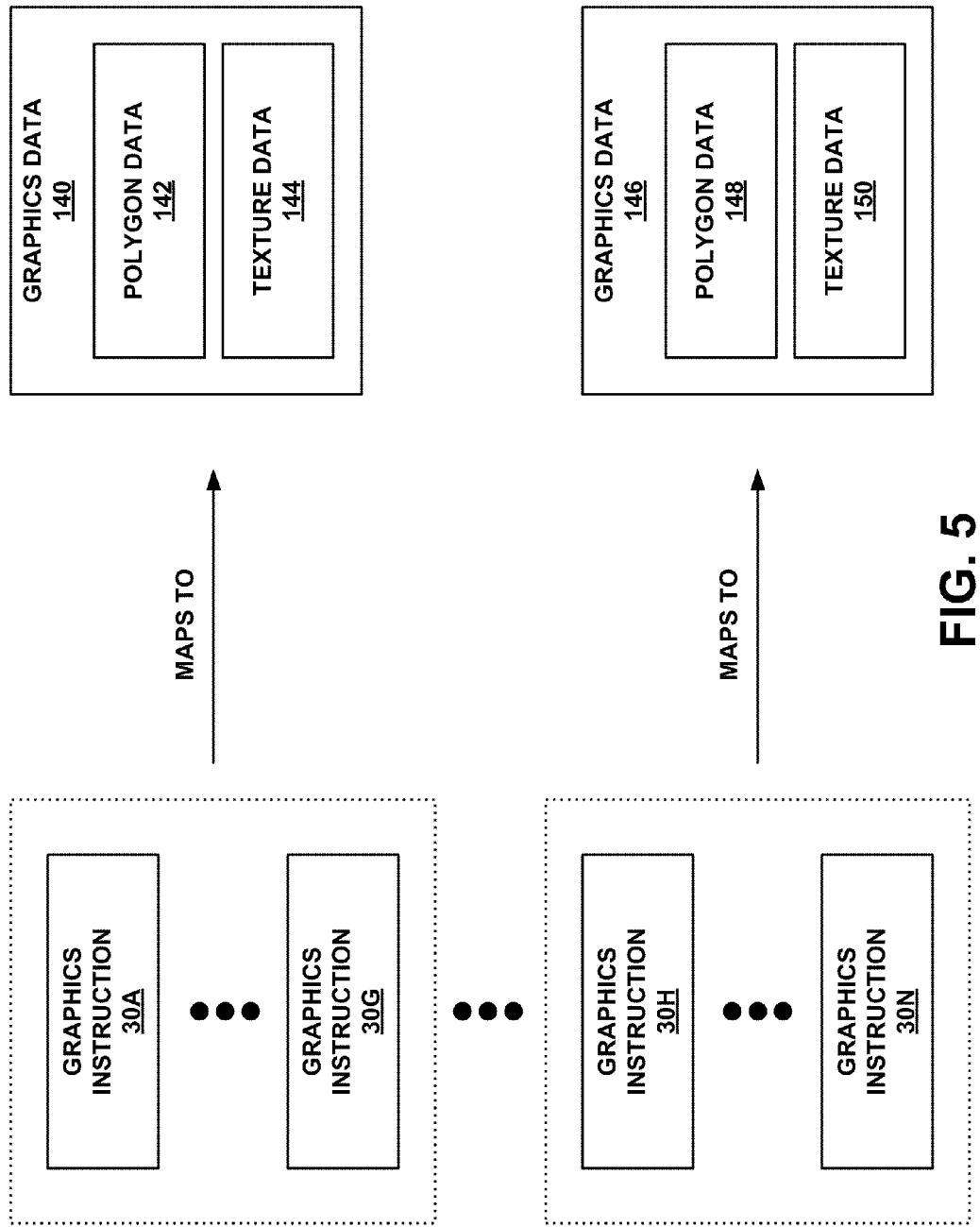

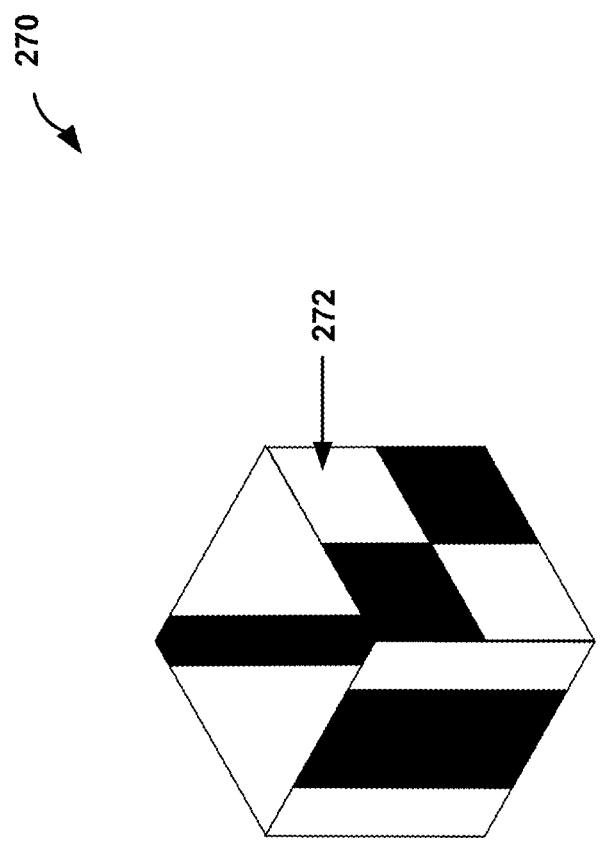

MAPPING GRAPHICS INSTRUCTIONS TO ASSOCIATED GRAPHICS DATA DURING PERFORMANCE ANALYSIS

CLAIM OF PRIORITY UNDER 35 U.S.C. §119

The present Application for Patent claims priority to Provisional Application No. 61/083,665 entitled MAPPING GRAPHICS INSTRUCTIONS TO ASSOCIATED GRAPHICS DATA DURING PERFORMANCE ANALYSIS filed Jul. 25, 2008, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

61/083,656 filed Jul. 25, 2008, filed concurrently herewith, assigned to the assignee hereof, and expressly incorporated by reference herein; and 61/083,659 filed Jul. 25, 2008, filed concurrently herewith, assigned to the assignee hereof, and expressly incorporated by reference herein.

TECHNICAL FIELD

This disclosure relates to display of graphics images.

BACKGROUND

Graphics processors are widely used to render two-dimensional (2D) and three-dimensional (3D) images for various applications, such as video games, graphics programs, computer-aided design (CAD) applications, simulation and visualization tools, and imaging. Display processors may be used to display the rendered output of the graphics processor for presentation to a user via a display device.

OpenGL® (Open Graphics Library) is a standard specification that defines an API (Application Programming Interface) that may be used when writing applications that produce 2D and 3D graphics. Other languages, such as Java, may define bindings to the OpenGL API's through their own standard processes. The interface includes multiple function calls, or instructions, that can be used to draw scenes from simple primitives. Graphics processors, multi-media processors, and even general purpose CPU's can then execute applications that are written using OpenGL function calls. OpenGL ES (embedded systems) is a variant of OpenGL that is designed for embedded devices, such as mobile wireless phones, digital multimedia players, personal digital assistants (PDA's), or video game consoles.

Graphics applications, such as 3D graphics applications, may describe or define contents of a scene by invoking API's, or instructions, that in turn use the underlying graphics hardware, such as one or more processors in a graphics device, to generate an image. The graphics hardware may undergo a series of state transitions that are exercised through these API's. A full set of states for each API call, such as a draw call or instruction, may describe the process with which the image is rendered from one or more graphics primitives, such as one or more triangles, by the hardware.

A graphics artist may often define one or more portions of a scene by creating various graphics primitives. For example, a graphics artist may use a digital content creation (DCC) tool to generate three-dimensional (3D) primitive polygonal and/or texture data that comprise constituent parts of the scene. This data may then be incorporated into a graphics application and processed within a content-processing pipeline of a hardware graphics device in order to create, or render, the final graphics image data that is to be displayed to a user. In many situations, different artists may define different portions of a scene, which may then need to be combined into a single graphics application, and these artists may also work independently of each other. In addition, the artists may frequently need to communicate and work with the developers of the graphics applications when making modifications to the primitive polygonal and/or texture data.

SUMMARY

In general, this disclosure relates to techniques for optimizing a graphics scene, such as a three-dimensional (3D) scene, by allowing application developers and/or graphics artists to identify which graphics instructions and associated graphics data (e.g., polygonal data, texture data) may be associated with identified performance issues. As a result, an application developer may not need to use a trial-and-error process on a target device (e.g., mobile device, graphics device) to determine the part of the scene within an application that causes a performance issue, or manually communicate this information to one or more artists to resolve the issue. Instead, the developer can use a simulation environment to identify performance issues, and the simulation environment is able to automatically identify the associated graphics data that may have caused these issues. The identified performance issues and/or associated graphics data may be communicated to the developer and corresponding artist(s) for resolution. The artists may also be able to view the communicated information directly on their remote computing devices.

In one aspect, a method comprises receiving mapping information from the external device, wherein the mapping information includes information to map the graphics instructions to primitive graphics data that is used to render one or more graphics images during execution of the graphics instructions, and identifying a performance issue associated with execution of at least one graphics instruction within the graphics instructions. The method further comprises using the mapping information to identify a portion of the primitive graphics data that is associated with the performance issue based upon execution of the at least one graphics instruction.

In one aspect, a computer-readable medium comprises computer-executable instructions for causing one or more processors to: receive graphics instructions from an external device; receive mapping information from the external device, wherein the mapping information includes information to map the graphics instructions to primitive graphics data that is used to render one or more graphics images during execution of the graphics instructions; identify a performance issue associated with execution of at least one graphics instruction within the graphics instructions; and use the mapping information to identify a portion of the primitive graphics data that is associated with the performance issue based upon execution of the at least one graphics instruction.

In one aspect, a device comprises a display device and one or more processors. The one or more processors are configured to: receive graphics instructions from an external device; receive mapping information from the external device, wherein the mapping information includes information to map the graphics instructions to primitive graphics data that is used to render one or more graphics images during execution of the graphics instructions; identify a performance issue associated with execution of at least one graphics instruction within the graphics instructions; and use the mapping information to identify a portion of the primitive graphics data that is associated with the performance issue based upon execution of the at least one graphics instruction.

The techniques described in this disclosure may be implemented in hardware, software, firmware, or any combination thereof If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects are set forth in the accompanying drawings and the description below. Other features, objects, and advantages will be apparent from the description and drawings, and from the claims.

BRIEF DESCRIPTION OF DRAWINGS

FIG. 5 is a conceptual diagram illustrating exemplary mapping between individual graphics instructions and graphics data, according to one aspect of the disclosure.

FIG. 11 is a conceptual diagram illustrating texture information within a screen area 270 that may be provided by a display device, according to one aspect of the disclosure.

DETAILED DESCRIPTION

Figure 1:
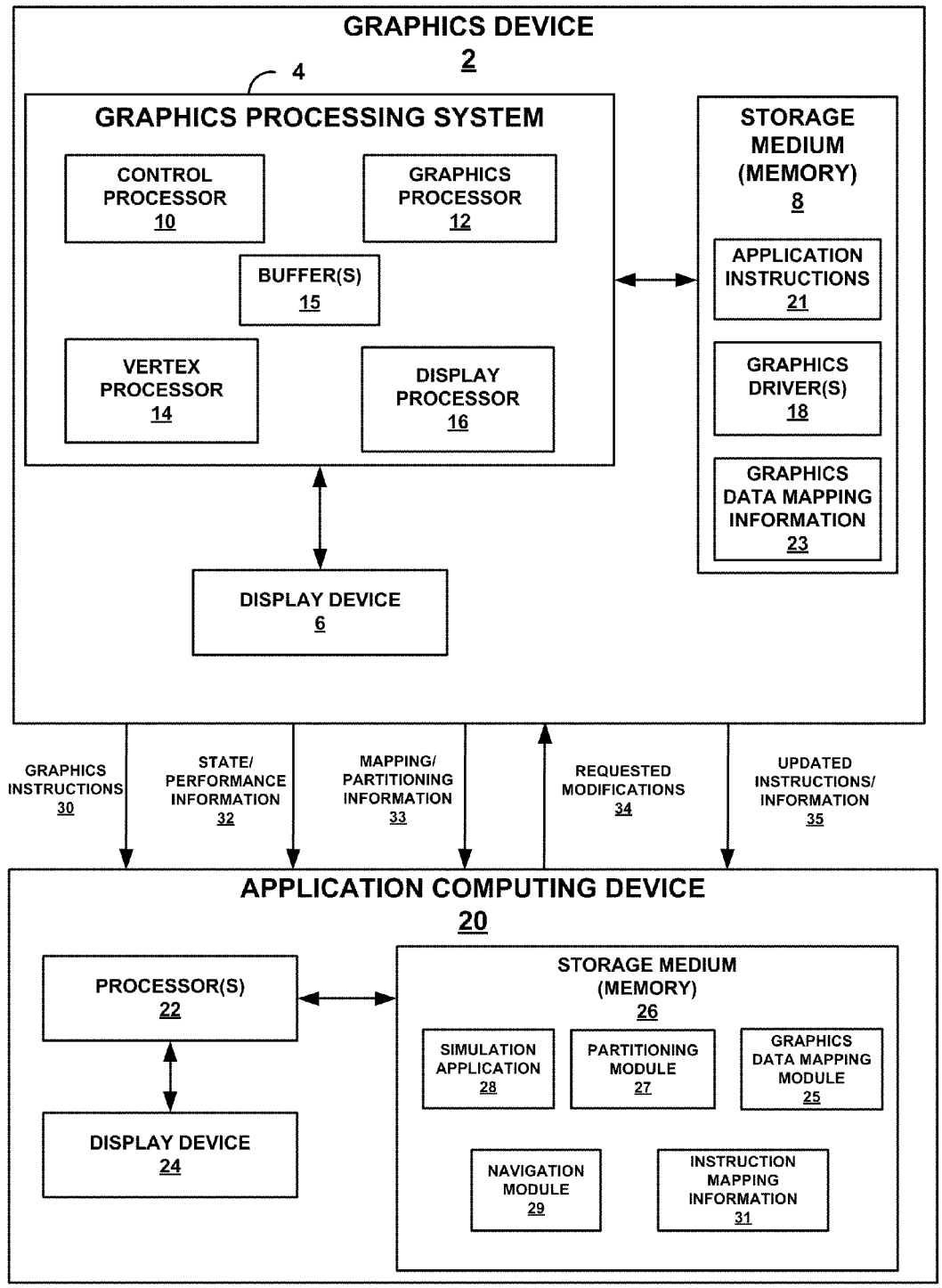
FIG. 1 is a block diagram illustrating a graphics device that may provide graphics instructions, state and/or performance information, along with mapping and/or partitioning information, to an application computing device, according to one aspect of the disclosure.

FIG. 1 is a block diagram illustrating a graphics device 2 that may provide graphics instructions 30, state and/or performance information 32, and mapping/partitioning information 33, to an application computing device 20, according to one aspect of the disclosure. Graphics device 2 may be a stand-alone device or may be part of a larger system. For example, graphics device 2 may be part of a wireless communication device (such as a wireless mobile handset), or may be part of a digital camera, video camera, digital multimedia player, personal digital assistant (PDA), video game console, other video device, or a dedicated viewing station (such as a television). Graphics device 2 may also comprise a personal computer or a laptop device. Graphics device 2 may also be included in one or more integrated circuits, chips, or chipsets that may be used in some or all of the devices described above.

In some cases, graphics device 2 may be capable of executing various applications, such as graphics applications, video applications, audio applications, and/or other multi-media applications. For example, graphics device 2 may be used for graphics applications, video game applications, video playback applications, digital camera applications, instant messaging applications, video teleconferencing applications, mobile applications, or video streaming applications.

Graphics device 2 may be capable of processing a variety of different data types and formats. For example, graphics device 2 may process still image data, moving image (video) data, or other multi-media data, as will be described in more detail below. The image data may include computer-generated graphics data. In the example of FIG. 1, graphics device 2 includes a graphics processing system 4, a storage medium 8 (which may comprise memory), and a display device 6.

Programmable processors 10, 12, 14, and 16 may be included within graphics processing system 4. Programmable processor 10 is a control, or general-purpose, processor. Programmable processor 12 is a graphics processor, programmable processor 14 is a vertex processor, and programmable processor 16 is a display processor. Control processor 10 may be capable of controlling graphics processor 12, vertex processor 14, and/or display processor 16. In one aspect, graphics processing system 4 may include other forms of multi-media processors.

In graphics device 2, graphics processing system 4 is coupled both to storage medium 8 and to display device 6. Storage medium 8 may include any permanent or volatile memory that is capable of storing instructions and/or data, such as, for example, synchronous dynamic random access memory (SDRAM), read-only memory (ROM), non-volatile random access memory (NVRAM), embedded dynamic random access memory (eDRAM), static random access memory (SRAM), or flash memory. Display device 6 may be any device capable of displaying image data for display purposes, such as an LCD (liquid crystal display), plasma display device, or other television (TV) display device.

Vertex processor 14 is capable of managing vertex information and processing vertex transformations. In one aspect, vertex processor 14 may comprise a digital signal processor (DSP). Graphics processor 12 may be a dedicated graphics rendering device utilized to render, manipulate, and display computerized graphics. Graphics processor 12 may implement various complex graphics-related algorithms. For example, the complex algorithms may correspond to representations of two-dimensional or three-dimensional computerized graphics. Graphics processor 12 may implement a number of so-called "primitive" graphics operations, such as forming points, lines, and triangles or other polygon surfaces, to create complex, three-dimensional images on a display, such as display device 6.

Graphics processor 12 may carry out instructions that are stored in storage medium 8. Storage medium 8 is capable of storing application instructions 21 for an application (such as a graphics or video application), as well as one or more graphics drivers 18. Application instructions 21 may be loaded from storage medium 8 into graphics processing system 4 for execution. For example, one or more of control processor 10, graphics processor 12, and display processor 16 may execute instructions 21. In one aspect, application instructions 21 may comprise one or more downloadable modules that are downloaded dynamically, over the air, into storage medium 8. In one aspect, application instructions 21 may comprise a call stream of binary instructions that are generated or compiled from application programming interface (API) instructions created by an application developer.

Graphics drivers 18 may also be loaded from storage medium 8 into graphics processing system 4 for execution. For example, one or more of control processor 10, graphics processor 12, and display processor 16 may execute certain instructions from graphics drivers 18. In one example aspect, graphics drivers 18 are loaded and executed by graphics processor 12. Graphics drivers 18 will be described in further detail below.

Storage medium 8 also includes graphics data mapping information 23. Graphics data mapping information 23 includes information to map one or more of application instructions 21 to primitive graphics data that may be rendered during execution of application instructions 21. The graphics data, which may be stored in storage medium 8 and/or buffers 15, may include one or more primitives (e.g., polygons), and may also include texture data. Graphics data mapping information 23 may maintain a mapping of individual primitives that are to be rendered to individual instructions within application instructions 21. After the primitives have been rendered during execution of these individual instructions, mapping information 23 provides a mapping from these instructions back to the original graphics data that was used to render one or more images that are ultimately displayed on graphics device 6. Graphics data mapping information will be described in further detail below.

As also shown in FIG. 1, graphics processing system 4 includes one or more buffers 15. Control processor 10, graphics processor 12, vertex processor 14, and/or display processor 16 each have access to buffers 15, and may store data in or retrieve data from buffers 15. Buffers 15 may comprise cache memory, and may be capable of storing both data and instructions. For example, buffers 15 may include one or more of application instructions 21 or one or more instructions from graphics drivers 18 that have been loaded into graphics processing system 4 from storage medium 8. Buffers 15 and/or storage medium 8 may also contain graphics data used during instruction execution.

Applications instructions 21 may, in certain cases, include instructions for a graphics application, such as a 3D graphics application. Application instructions 21 may comprise instructions that describe or define contents of a graphics scene that includes one or more graphics images. When application instructions 21 are loaded into and executed by graphics processing system 4, graphics processing system 4 may undergo a series of state transitions. One or more instructions within graphics drivers 18 may also be executed to render or display graphics images on display device 6 during executing of application instructions 21.

In one aspect, graphics data mapping information 23 may be obtained during execution of application instructions 21, and then stored within storage medium 8. Application instructions 21 may include one or more bindings to graphics objects. Each binding creates a link between one or more of application instructions 21 and an individual graphics object that represents primitive graphics data (e.g., polygon data, texture data). The primitive graphics data that is bound to a set of instructions is used to render graphics image data during execution of this set of instructions. The bindings between the set of instructions and associated graphics data may be identified, extracted, and included within graphics data mapping information 23 to create a mapping between this set of instructions and the associated graphics data.

A full set of states for instruction, such as a draw call, may describe a process with which an image is rendered by graphics processing system 4. However, an application developer who has written application instructions 21 may often have limited ability to interactively view or modify these states for purposes of debugging or experimenting with alternate methods of describing or rendering images in a defined scene. In addition, different hardware platforms may have different hardware designs and implementations of these states and/or state transitions.

In addition, binning-based graphics hardware, such as one or more of processors 10, 12, 14, and 16, may often be implemented using a process in which the individual primitives destined for rendering are clustered into rectangular-shaped binning partitions, or bins, in order to divide up a scene of images displayed on a screen of display device 6. The hardware may do so based on screen size or resolution constraints of display device 6, or based on memory limitations of storage medium 8 associated with rendering operations. Primitives that may span across multiple binning partitions may be divided into multiple fragments by one or more of processors 10, 12, 14, or 16 along the edges of the partitions before the primitive fragments are rendered. The primitive fragments in each partition may then be rendered separately. Binning partitions, in general, may be varied in number, depending on the hardware architecture, and may have various sizes and shapes. For example, the binning partitions may include multiple (e.g., four, eight) rectangular-shaped partitions.

Thus, an individual primitive that may span, for example, across two binning partitions may be divided, into two fragments, and each of these two fragments may then be independently rendered. However, the graphics images generated by each of these fragments may then need to be re-combined within a frame of image data before being displayed on the screen of display device 6. Thus, dividing individual primitives that span across multiple binning partitions can have potential processing overhead, and cause overall performance.

In one aspect, an application developer may use application computing device 20, shown in FIG. 1, to assist in the processing of debugging and experimenting with alternate methods for describing or rendering images in a scene. Application computing device 20 includes one or more processors 22, a display device 24, and a storage medium 26, which may comprise memory. Processors 22 may include one or more of a control processor, a graphics processor, a vertex processor, and a display processor, according to one aspect. Storage medium 26 may include any permanent or volatile memory that is capable of storing instructions and/or data, such as, for example, synchronous dynamic random access memory (SDRAM), read-only memory (ROM), non-volatile random access memory (NVRAM), static random access memory (SRAM), or flash memory. Display device 24 may be any device capable of displaying image data for display purposes, such as an LCD (liquid crystal display), plasma display device, or other television (TV) display device.

Application computing device 20 is capable of capturing and analyzing graphics instructions 30, along with state and/or performance information 32, which is sent from graphics device 2. In one aspect, graphics drivers 18 are configured to send graphics instructions 30 and state/performance information 32 to application computing device 20. Graphics instructions 30 may include one or more of application instructions 21, and state/performance information 32 may be generated or captured during execution of graphics instructions 30 within graphics processing system 4.

State/performance information 32 includes information about the state and/or performance of graphics processing system 4 during instruction execution, and will be described in more detail below. State/performance information 32 may include graphics data (e.g., primitive and/or rasterized graphics data) that may be used, or is otherwise associated, with graphics instructions 30. Graphics processing system 4 may execute graphics instructions 30 to display an image, or a scene of images, on display device 6. Application computing device 20 is capable of using graphics instructions 30, along with state/performance information 32, to re-create the graphics image or scene that is also shown on display device 6 of graphics device 2.

Graphics device 2 may also send mapping and/or partitioning information 33 to application computing device 20. In one aspect, graphics drivers 18 are configured to send mapping/partitioning information 33 to application computing device 20. Mapping/partitioning information 33 may include one or more portions of graphics data mapping information 23, which includes information to map graphics data to individual instructions within graphics instructions 30. For example, mapping/partitioning information 33 may include information to map one or more primitives (e.g., polygons) or texture data to individual instructions within graphics instructions 30.

Mapping/partitioning information 33 may also include partitioning information that is generated and provided by graphics device 2. This partitioning information, in some cases, may be generated and provided by one or more of processors 10, 12, 14, and 16, such as control processor 10. Partitioning information may include information that identifies the number, type, size, and/or shape of binning partitions, or bins, that may be used within graphics processing system 4 to render graphics data into one or more graphics images, and display such images on display device 6. As described previously, graphics device 2 may partition a screen space, or size, or display device 6 into partitions, based upon, for example, memory-size limitations of buffers 15 and/or storage medium 8 during rendering operations. The partitioning information provides information about the partitions that are created and used.

Simulation application 28 may be executed by processors 22 of application computing device 20 to re-create the graphics image or scene upon receipt of graphics instructions 30 and state/performance information 32, and display the image, or scene of images, on display device 24. Simulation application 28 may comprise a software module that contains a number of application instructions. Simulation application 28 is stored in storage medium 26, and may be loaded and executed by processors 22. Simulation application 28 may be pre-loaded into storage medium 26, and may be customized to operate with graphics device 2. In one aspect, simulation application 28 simulates the hardware operation of graphics device 2. Different versions of simulation application 28 may be stored in storage medium 26 and executed by processors 22 for different graphics devices having different hardware designs. In some cases, software libraries may also be stored within storage medium 26, which are used in conjunction with simulation application 28. In one aspect, simulation application 28 may be a generic application, and specific hardware or graphics device simulation functionality may be included within each separate library that may be linked with simulation application 28 during execution.

In one aspect, a visual representation of state/performance information 32 may be displayed to application developers on display device 24. In addition, a visual representation of graphics instructions 30 may also be displayed. Because, in many cases, graphics instructions 30 may comprise binary instructions, application computing device 20 may use instruction mapping information 31 to generate the visual representation of graphics instructions 30 on display device 24. Instruction mapping information 31 is stored within storage medium 26 and may be loaded into processors 22 in order to display a visual representation of graphics instructions 30.

In one aspect, instruction mapping information 31 may include mapping information, such as within a lookup table, to map graphics instructions 30 to corresponding API instructions that may have been previously compiled when generating graphics instructions 30. Application developers may write programs that use API instructions, but these API instructions are typically compiled into binary instructions, such as graphics instructions 30 (which are included within application instructions 21), for execution on graphics device 2. One or more instructions within graphics instructions 30 may be mapped to an individual API instruction. The mapped API instructions may then be displayed to an application developer on display device 24 to provide a visual representation of the graphics instructions 30 that are actually being executed.

In one aspect, a user, such as an application developer, may wish to change one or more of the graphics instructions 30 to determine, for example, the effects of such changes on performance. In this aspect, the user may change the visual representation of graphics instructions 30. Mapping information 31 may then be used to map these changes within the visual representation of graphics instructions 30 to binary instructions that can then be provided back to graphics device 2 within requested modifications 34, as will be described in more detail below.

As described above, the graphics image that is displayed on display device 24 of application computing device 20 may be a representation of an image that is displayed on graphics device 2. Because simulation application 28 may use graphics instructions 30 and state/performance information 32 to re-create an image or scene exactly as it is presented on graphics device 2, application developers that use application computing device 20 may be able to quickly identify potential performance issues or bottlenecks during execution of graphics applications 30, and even prototype modifications to improve the overall performance of graphics applications 30.

Storage medium 26 also includes graphics data mapping module 25. Graphics data mapping module 25 may be executed by processors 22. Graphics data mapping module 25 receives and processes mapping/partitioning information 33 to map individual instructions within graphics instructions 30 to specific primitive graphics data, such as polygon or texture data. This graphics data may be included within state/performance information 32. During execution of graphics instructions 30, simulation application 28 may determine that a specific set of instructions may be causing a performance issue or bottleneck. These issues or bottlenecks may be based upon overly high processor usage or utilization, for example. Graphics data mapping module 25 may then use mapping/partitioning information 33 to map this specific set of instructions to a portion of the graphics data that may be use to render image data during execution of these instructions. This portion of graphics data may be associated with the identified performance issue.

Application computing device 20 may identify or display the specific set of instructions and/or the portion of the graphics data, such as by displaying such information on display device 24. In such fashion, application computing device 20 is capable of automatically identifying and displaying selected portions of primitive graphics data that may be a cause for one or more performance issues during execution of graphics instructions 30. An application developer may then be able to address or resolve these issues more easily and effectively. In addition, application computing device 20 may be capable of automatically sending the performance and/or mapping information to one or more external devices used by graphics artists, as will be described in more detail below, such that these artists may have easy access to performance and graphics data information that they may be able to use to resolve performance issues.

Without the use of mapping information, it may otherwise be difficult to identify portions of the original primitive graphics data, such as data created by graphics artists, in relation to specific graphics instructions that are associated with particular problems during execution, because such problems may more typically be identified after the graphics data has been rendered into output image data upon execution of the graphics instructions. The mapping information provides a mapping back to original graphics data that may be a cause for any such later-identified problems upon instruction execution. These problems may relate to certain performance issues caused, for example, by too many textures, too many polygons, and the like. An application developer or artist may choose to make certain modifications to the textures or polygons (e.g., moving polygons, adding or removing textures, re-arranging polygons) in the original graphics data upon learning of the potential problems caused by the original graphics data.

An application developer may choose to make one or more requested modifications 34 to graphics instructions 30 and/or state/performance information 32 during execution of simulation application 28 on application computing device 20 and display of the re-created image on display device 24. Any such requested modifications 34 may be based upon observed performance issues, or bottlenecks, during execution of graphics instructions 30 or analysis of state/performance information 32. These requested modifications 34 may then be sent from application computing device 20 to graphics device 2, where they are processed by graphics processing system 4. In one aspect, one or more of graphics drivers 18 are executed within graphics processing system 4 to process requested modifications 34. Requested modifications 34, in some cases, may include modified instructions. In some cases, requested modifications may include modified state and/or performance information.

Upon processing of requested modifications 34, updated instructions and/or information 35 is sent back to application computing device 20, such as by one or more of graphics drivers 18. Updated instructions/information 35 may include updated graphics instructions for execution based upon requested modifications 34 that were processed by graphics device 2. Updated instructions/information 35 may also include updated state and/or performance information based upon the requested modifications 34 that were processed by graphics device 2. In some cases, updated instructions/information 35 may also include updated mapping information from graphics data mapping information 23.

The updated instructions/information 35 is processed by simulation application 28 to update the display of the re-created image information on display device 24, and also to provide a visual representation of updated instructions/information 35 to the application developer (which may include again using instruction mapping information 31). The application developer may then view the updated image information on display device 24, as well as the visual representation of updated instructions/information 35, to determine if the performance issues have been resolved or mitigated. The application developer may use an iterative process to debug graphics instructions 30 or prototype modifications to improve the overall performance graphics applications 30.

In one aspect, application computing device 20 uses mapping/partitioning information 23 to display a visual, graphical representation of partitions that overlay the graphics images displayed on display device 24. These partitions graphically divide the scene comprising these images on display device 24. For example, simulation application 28 may use partitioning module 27 to process mapping/partitioning information 33 to create the graphics representation of these partitions (e.g., multiple rectangular-shaped partitions) on a screen of display device 24. Partitioning module 27 may be loaded from storage medium 26 and executed by processors 22. When executed, partitioning module 27 may also analyze graphics data, which may be included within state/performance information 32, for one or more graphics images to determine which portions of the graphics data are associated with multiple ones of the partitions. For example, partitioning module 27 may analyze one or more polygons that are used to create graphics images for display on display device 24, and determine which ones of these polygons may span across multiple partitions, as will be described in more detail below.

Storage medium 26 further includes a navigation module 29, which may also be executed by processors 22. Simulation application 28, during execution, may use navigation module 29 to display a navigation controller on display device. A user, such as an application developer, may interact with this navigation controller to view a modified perspective view of graphics images within a scene that is displayed on display device 24. Partitioning module 27 may then display a graphical representation of partitions that overlay the modified perspective view of the graphics images to graphically divide the modified scene. Partitioning module 27 may also then analyze one or more polygons that are used to create the graphics images in the modified perspective view to determine which ones of the polygons may span across multiple partitions.

Figure 2:
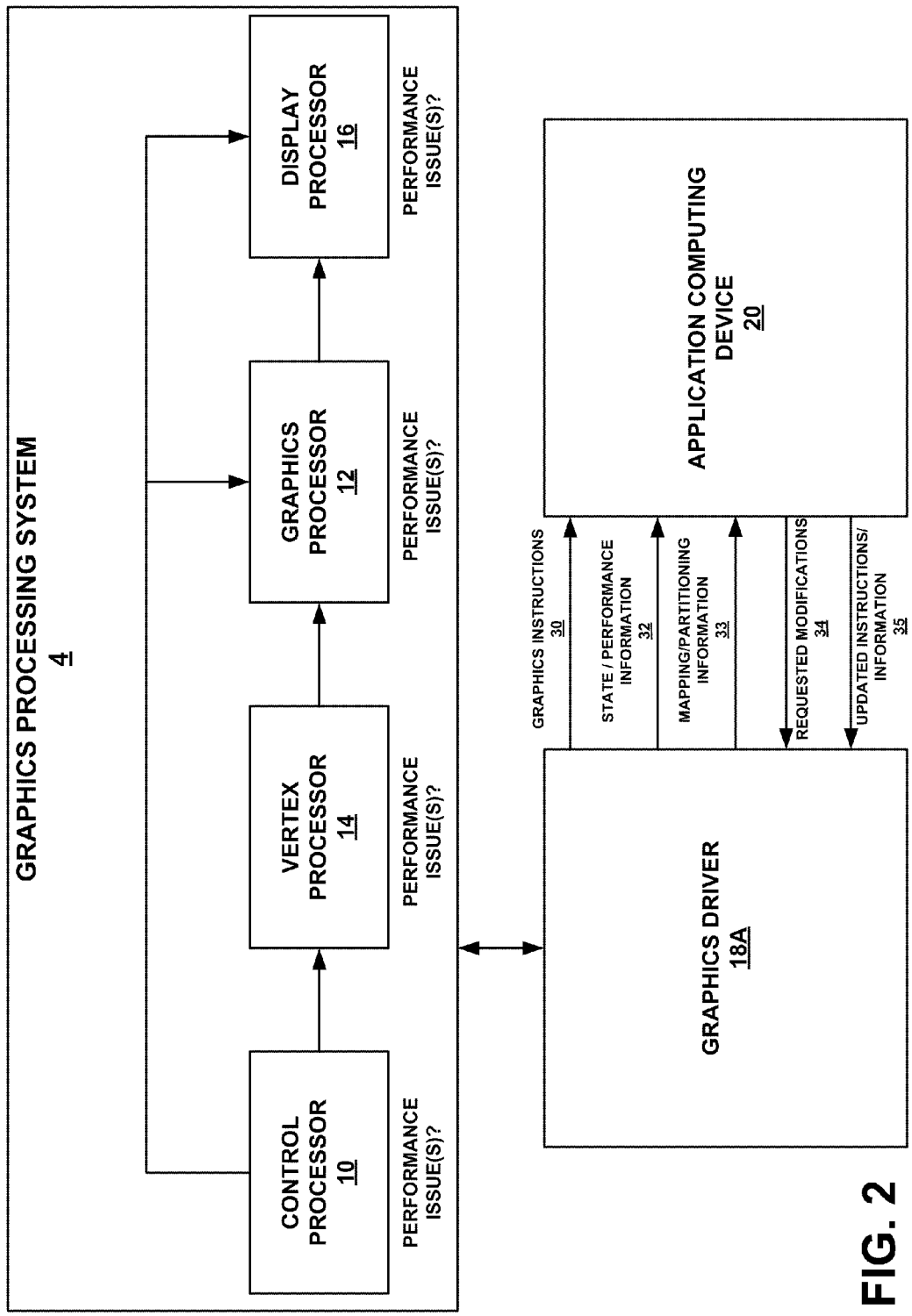
FIG. 2 is a block diagram illustrating certain details of the graphics processing system and the application computing device shown in FIG. 1, according to one aspect of the disclosure.

FIG. 2 is a block diagram illustrating certain details of graphics processing system 4 and application computing device 20 shown in FIG. 1, according to one aspect. In FIG. 2, it is assumed that application computing device 20 is coupled to graphics processing system 4 of device 2. However, this is shown for illustration purposes only. In other scenarios, application computing device 20 may be coupled to many other forms of graphics processing systems and devices.

As shown in FIG. 2, graphics processing system 4 includes four programmable processors: control processor 10, vertex processor 14, graphics processor 12, and display processor 16, which are also shown in FIG. 1. Control processor 10 may control any of vertex processor 14, graphics processor 12, or display processor 16. In many cases, these processors 10, 12, 14, and 16 may be part of a graphics processing pipeline within system 4.

Control processor 10 may control one or more aspects of the flow of data or instruction execution through the pipeline, and may also provide geometry information for a graphics image to vertex processor 14. Vertex processor 14 may manage vertex transformation or geometry processing of the graphics image, which may be described or defined according to multiple vertices in primitive geometry form. Vertex processor 14 may provide its output to graphics processor 12, which may perform rendering or rasterization operations on the graphics image. Graphics processor 12 may provide its output to display processor 16, which prepares the graphics image, in pixel form, for display. Graphics processor 12 may also perform various operations on the pixel data, such as shading or scaling.

Often, graphics image data may be processed in this processing pipeline during execution of graphics instructions 30, which may be part of application instructions 21 (FIG. 1). As a result, graphics instructions 30 may be executed by one or more of control processor 10, vertex processor 14, graphics processor 12, and display processor 16. Application developers may typically not have much knowledge or control of which particular processors within graphics processing system 4 execute which ones of graphics instructions 30. In some cases, one or more of control processor 10, vertex processor 14, graphics processor 12, and display processor 16 may have performance issues, or serve as potential bottlenecks within the processing pipeline, during the execution of graphics instructions 30. In these cases, overall performance within graphics processing system 4 may be deteriorated, and the application developer may wish to make changes the graphics instructions 30 to improve performance. However, the developer may not necessarily know which ones of processors 10, 12, 14, or 16 may be the ones that have performance issues.

In particular, binning-based operations, in which primitive graphics data is divided up across multiple binning partitions prior to rendering, may often create certain performance issues. For example, if a polygon (such as triangle 266 shown in the example of FIG. 10) spans across two different partitions (e.g., partitions 256 and 258 shown in FIG. 10), the polygon may be divided into two constituent fragments, one for each partition, and then these two constituent fragments may be independently rendered into separate graphics images comprising pixel data. These two separate graphics images may then need to be combined prior to display in order to create a visual representation of triangle 266. The independent rendering operations for the two fragments of triangle 266, along with the combination operation for the two related graphics images, can cause performance overhead.

To assist with the problem of identifying performance bottlenecks and potential solutions, the graphics driver 18A of graphics device 2 may capture, or collect, graphics instructions 30 from graphics processing system 4 and route them to application computing device 20, as shown in FIG. 2. Graphics driver 18A is part of graphics drivers 18 shown in FIG. 1. Graphics driver 18A may be loaded and executed by one or more of control processor 10, vertex processor 14, graphics processor 12, and display processor 16. In addition, graphics driver 18A may also collect state and/or performance information 32 from one or more of control processor 10, vector processor 14, graphics processor 12, and display processor 16 and route this information 32 to application computing device 20, as well. In one aspect, graphics driver 18A may comprise an OpenGL ES driver when graphics instructions 30 include binary instructions that may have been generated or compiled from OpenGL ES API instructions.

Various forms of state data may be included within state/performance information 32. For example, the state data may include graphics data used during execution of, or otherwise associated with, graphics instructions 30. The state data may be related to a vertex array, such as position, color, coordinates, size, or weight data. State data may further include texture state data, point state data, line state data, polygon state data, culling state data, alpha test state data, blending state data, depth state data, stencil state data, or color state data. As described previously, state data may include both state information and actual data. In some cases, the state data may comprise data associated with one or more OpenGL tokens.

Various forms of performance data may also be included within state/performance information 32. In general, this performance data may include metrics or hardware counter data from one or more of control processor 10, vertex processor 14, graphics processor 12, and display processor 16. The performance data may include frame rate or cycle data. The cycle data may include data for cycles used for profiling, command arrays, vertex and index data, or other operations. In various aspects, various forms of state and performance data may be included within state/performance information 32 that is collected from graphics processing system 4 by graphics driver 18A.

As described previously, application computing device 20 may display a representation of a graphics image according to received graphics instructions 30 and state/performance information 32. Application computing device 20 may also display a visual representation of state/performance information 32. By viewing and interacting with the re-created graphics image and/or the visual representation of the state/performance information 32, an application developer may be able to quickly identify and resolve performance issues within graphics processing system 4 of graphics device 2 during execution of graphics instructions 30. For example, the application developer may be able to identify which specific ones of processors 10, 12, 14, and/or 16 may have performance issues.

In addition, graphics driver 18A also provides mapping and/or partitioning information 33 to application computing device 20. As described previously in reference to FIG. 1, partitioning module 27 may process the received mapping/partitioning information 33 to display a graphical representation of partitions on display device 24 that overlay the graphics image in a scene, in order to graphically divide the scene. Partitioning module 27 may also use mapping/partitioning information 33 to analyze graphics data, which may be included within state/performance information 32, to determine which portions of the data are associated with multiple ones of the partitions.

In addition, mapping/partitioning information 33 may include mapping information that maps the graphics data, which may be used to generate one or more graphics images, to identified instructions within graphics instructions 30. For example, the mapping/partitioning information 33 may include information to map one or more of graphics instructions 30 to a portion of primitive graphics data, such as polygon or texture data. If an identified performance issue is determined to be associated with these one or more instructions, the mapping information may be used to determine the portion of graphics data that may also be associated with this performance issue during execution of the one or more instructions. Typically, these one or more instructions, upon execution, render the portion of graphics data into image data. Thus, after rendering is complete and the image data is displayed, it may be difficult to identify the original graphics data associated with an issue without the use of such mapping information.

In an attempt to identify a workaround or resolution to any identified performance issues, the developer may initiate one or more requested modifications 34 on application computing device 20. For example, the developer may interact with the re-created image or the representation of state/performance information 32 to create the requested modifications 34. In some cases, the developer may even directly change the state/performance information 32, as described in more detail below, to generate the requested modifications 34. In certain cases, requested modifications 34 may include one or more requests to disable execution of one or more of graphics instructions 30 in graphics processing system 4 of graphics device 2, or may include requests to modify one or more of graphics instructions 30.

In some cases, the user may interact with a navigation controller displayed on display device 24 to request that a modified perspective view of a graphics scene be displayed. Navigation module 29 may manage the display of and interaction with this navigation controller. Any requests entered by the user via a user interface may be included with requested modifications 34.

Requested modifications 34 are sent from application computing device 20 to graphics driver 18A, which handles the requests for graphics device 2 during operation. In many cases, the requested modifications 34 may include requests to modify state information, which may include data, within one or more of processors 10, 12, 14, or 16 within graphics processing system 4 during execution of graphics instructions 30. Graphics driver 18A may then implement the changes within graphics processing system 4 that are included within requested modifications 34. These changes may alter the flow of execution amongst processors 10, 12, 14, and/or 16 for execution of graphics instructions 30. In certain cases, one or more graphics instructions 30 may be disabled during execution in graphics processing system 4 according to requested modifications 34.

Graphics driver 18A is capable of sending updated instructions and/or information 35 to application computing device 20 in response to the processing of requested modifications 34. Updated instructions/information 35 may include updated state information collected from graphics processing system 4 by graphics driver 18A, including performance information. Updated instructions/information 35 may include updated graphics instructions and/or graphics data. In some cases, updated instructions/information 35 may also include updated mapping information from graphics data mapping information 23 to map updated instructions to original (primitive) graphics data.

Application computing device 20 may use updated instructions/information 35 to display an updated representation of the graphics image, as well as a visual representation of updated instructions/information 35. The application developer may then be capable of assessing whether the previously identified performance issues have been resolved or otherwise addressed. For example, the application developer may be able to analyze the updated image, as well as the visual representation of updated instructions/information 35 to determine if certain textures, polygons, or other features have been optimized, or if other performance parameters have been improved.

Updated instructions/information 35 may also include updated mapping and/or partitioning information, such as an updated mapping of graphics data to instructions that are also included within instructions/information 35. If an updated perspective view of a scene is displayed on display device 24 as a result of updated instructions/information 35, partitioning module 27 may display a graphical representation of partitions that overlay the modified perspective view and that graphically divide the modified scene. Partitioning module 27 may also analyze graphics data for the modified perspective view (which may also be included within updated instructions/information 35) to determine which portions of the graphics data are associated with multiple ones of the partitions.

In such fashion, the application developer may be able to rapidly and effectively debug or analyze execution of graphics instructions 30 within an environment on application computing device 20 that simulates the operation of graphics processing system 4 on graphics device 2. The developer may iteratively interact with the displayed image and state/performance information on application computing device 20 to analyze multiple graphics images in a scene or multiple image frames to maximize execution performance of graphics instructions 30. Examples of such interaction and displayed information on application computing device 20 will be presented in more detail below.

Figure 3:
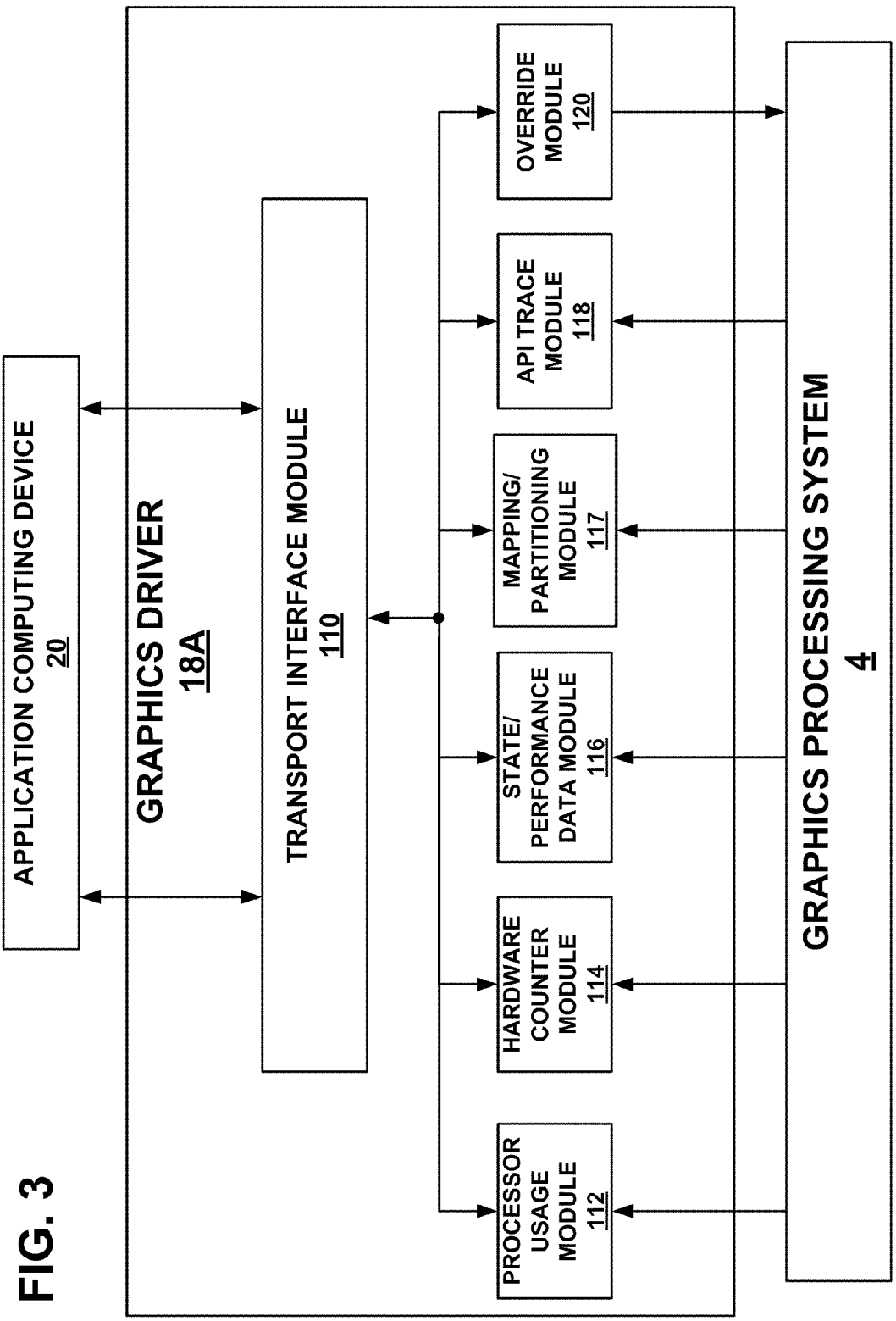
FIG. 3 is a block diagram illustrating additional details of the graphics driver shown in FIG. 2, according to one aspect of the disclosure.

FIG. 3 is a block diagram illustrating additional details of graphics driver 18A shown in FIG. 2, according to one aspect. As described previously, graphics driver 18A may comprise instructions that can be executed within graphics processing system 4 (such as, for example, by one or more of control processor 10, vertex processor 14, graphics processor 12, and display processor 16), and may be part of graphics drivers 18. Execution of graphics driver 18A allows graphics processing system 4 to communicate with application computing device 20. In one aspect, graphics driver 18A may comprise instructions that can be executed within graphics processing system 54, and may be part of graphics drivers 68.

Graphics driver 18A, when executed, includes various functional blocks, which are shown in FIG. 3 as transport interface 110, processor usage module 112, hardware counter module 114, state/performance data module 116 that can manage other state and/or performance data, API trace module 118, and override module 120. Graphics driver 18A uses transport interface module 110 to communicate with application computing device 20.

Processor usage module 112 collects and maintains processor usage information for one or more of control processor 10, vertex processor 14, graphics processor 12, and display processor 16. The processor usage information may include processing cycle and/or performance information. Cycle data may include data for cycles used for profiling, command arrays, vertex and index data, or other operations. Processor usage module 112 may then provide such processor usage information to application computing device 20 via transport interface module 110. In some cases, processor usage module 112 provides this information to device 20 as it receives the information, in an asynchronous fashion. In other cases, processor usage module 112 may provide the information upon receipt of a request from device 20.

Hardware counter module 114 collects and maintains various hardware counters during execution of instructions by one or more of control processor 10, graphics processor 12, vertex processor 14, or display processor 16. The counters may keep track of various state indicators and/or metrics with respect to instruction execution within graphics processing system 4. Hardware counter module 114 may provide information to device 20 asynchronously or upon request.

State/performance data module 116 collects and maintains other state and/or performance data for one or more of control processor 10, graphics processor 12, vertex processor 14, and display processor 16 in graphics processing system 4. For example, the state data may, in some cases, comprise graphics data. The state data may include data related to a vertex array, such as position, color, coordinates, size, or weight data. State data may further include texture state data, point state data, line state data, polygon state data, culling state data, alpha test state data, blending state data, depth state data, stencil state data, or color state data. Performance data may include various other metrics or cycle data. State/performance data module 116 may provide information to device 20 asynchronously or upon request.

Mapping/partitioning module 117 collects mapping and/or partitioning information 33 from one or more of control processor 10, graphics processor 12, vertex processor 14, and display processor 16, and may also collect information from graphics data mapping information 23 (FIG. 1). The mapping information may include information to map identified portions of graphics data, which are rendered to generate graphics images for display, to one or more of graphics instructions 30. This mapping information may be helpful in mapping individual instructions back to the original graphics data that was used to render the output images. The partitioning information may include information identifying a number, type, size, shape, etc. of partitions that are created and used within graphics processing system 4 when splitting apart graphics data into constituent fragments prior to rendering. Mapping/partitioning module 117 may provide mapping/partitioning information 33 to application computing device 20.

API trace module 118 manages a flow and/or trace of graphics instructions that are executed by graphics processing system 4 and transported to application computing device 20 via transport interface module 110. As described previously, graphics device 2 provides a copy of graphics instructions 30, which are executed by graphics processing system 4 in its processing pipeline, to device 20. API trace module 118 manages the capture and transport of these graphics instructions 30. API trace module 118 may also provide certain information used with instruction mapping information 31 (FIG. 1) to map graphics instructions 30 to a visual representation of graphics instructions 30, such as API instructions that may have been used to generate graphics instructions 30.

Override module 120 allows graphics driver 18A to change, or override, the execution of certain instructions within graphics processing system 4. As described previously, application computing device 20 may send one or more requested modifications, such as modifications 34, to graphics device 2. In certain cases, requested modifications 34 may include one or more requests to disable execution of one or more of graphics instructions 30 in graphics processing system 4, or requests to modify one or more of graphics instructions 30. In some cases, requested modifications 34 may include requests to change state/performance information 32.

Override module 120 may accept and process requested modifications 34. For example, override module 120 may receive from device 20 any requests to modify one or more of graphics instructions 30, along with any requests to modify state/performance information 32, and send such requests to graphics processing system 4. One or more of control processor 10, graphics processor 12, vertex processor 14, and display processor 16 may then process these requests and generate updated instructions/information 35. Override module 120 may then send updated instructions/information 35 to application computing device 20 for processing, as described previously.

In such fashion, graphics driver 18A provides an interface between graphics device 2 and application computing device 20. Graphics driver 18A is capable of providing graphics instructions and state/performance information 32 to application computing device 20, and also receiving requested modifications 34 from application computing device 20. After processing such requested modifications 34, graphics driver 18A is subsequently able to provide updated instructions/information 35 back to application computing device 20.

Figure 4A:
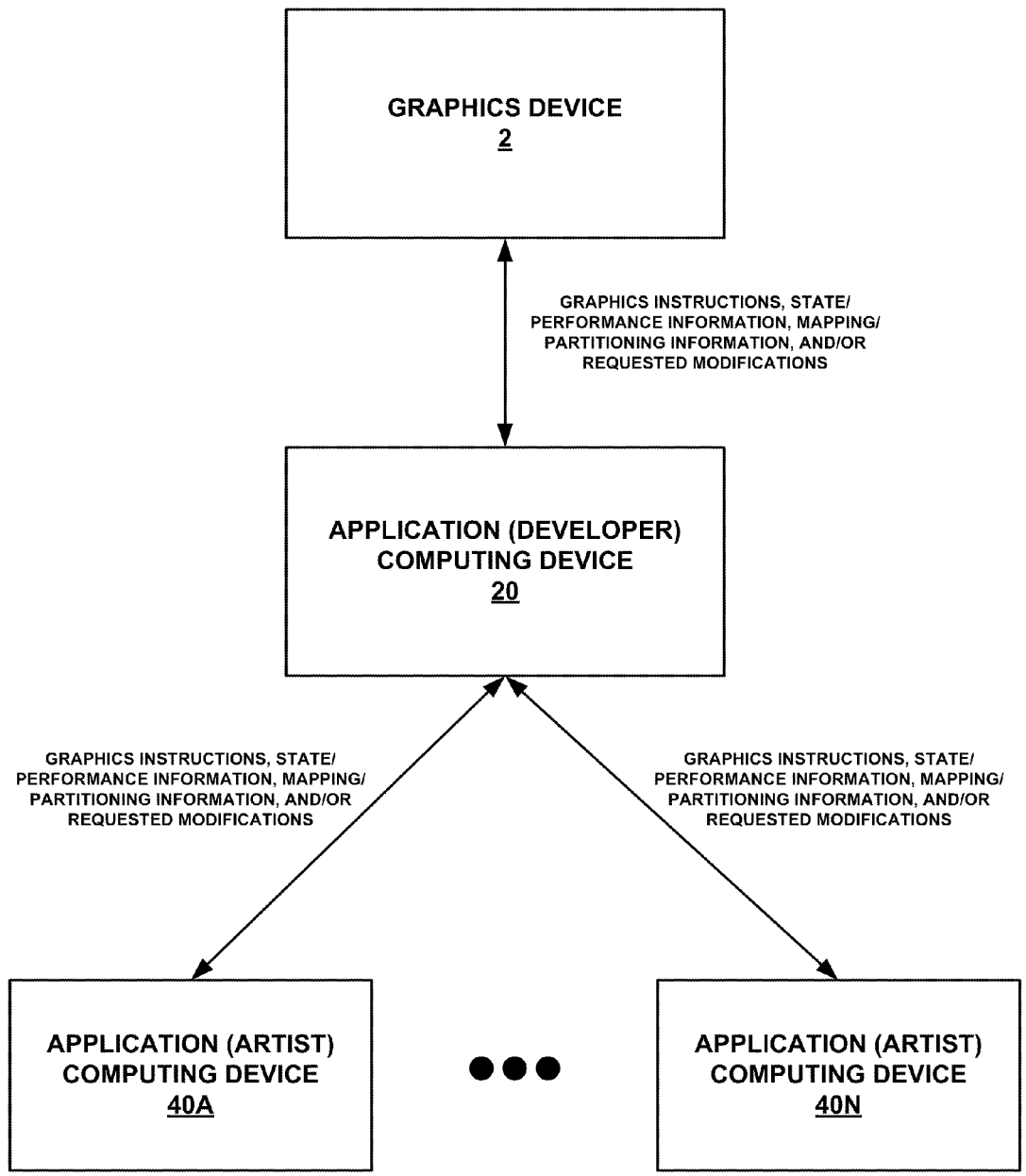
FIG. 4A is a block diagram illustrating the graphics device and application computing device shown in FIG. 1 coupled to one or more additional application computing devices, according to one aspect of the disclosure.

FIG. 4A is a block diagram illustrating graphics device 2 and application computing device 20 shown in FIG. 1 coupled to one or more additional application computing devices 40A-40N, according to one aspect. In this aspect, graphics device 2 is coupled to application computing device 20, as shown in FIG. 1, and application computing device 20 may be used by an application developer. As described previously, graphics device 2 may send application computing device 20 graphics instructions, state/performance information, and mapping/partitioning information. Application computing device 20 may send graphics device 2 one or more requested modifications.

In addition, application computing device 20 is coupled to one or more additional application computing devices 40A-40N. Application computing devices 40A-40N may be used by graphics artists who create primitive graphics data that may be used to render output graphics image data during execution of graphics instructions for a graphics application. Each artist may work independently from the other artists, and thus application computing devices 40A-40N may comprise independent devices located in distinct locations.

For example, application computing device 40A may be used by an artist located in Canada. Application computing device 40N may be used by an artist located in the United States (e.g., Chicago). Application computing device 20 may be able to communicate with either or both of application computing devices 40A and 40N, in this example, such as via a wireless or network connection (e.g., Internet connection). In many cases, application computing device 20 and application computing devices 40A-40N may comprise personal computing devices, and these devices may communicate via a network connection, such as a secure network connection. In certain cases, application computing device 20 may be co-located with graphics device 2, but may be remotely located from application computing devices 40A-40N. For example, if application computing device 40A is located in Canada and application computing device 40N is located in Chicago, application computing device 20 and graphics device 2 may be located in California.

Because an application developer using computing device 20 may not be co-located with the artists using computing devices 40A-40N, it may not always be easy for the application developer to interact or communicate with these artists. In particular, if the application developer using computing device 20 identifies one or more performance issues during execution of the graphics instructions, it may not always be easy for the developer to communicate these issues to the artists, or to provide the artists with the specific information regarding the portions of the graphics data created by these artists that may cause the performance issues. According to various aspects of the present disclosure, computing device 20 is capable of automatically providing such information to computing devices 40A-40N, such that the artists are able to review performance information, and also able to quickly identify portions of the graphics data they have created that may be sources of performance problems. These artists may also be able to make changes to the graphics data, and determine how these changes may affect the performance or resolve any performance issues.

As shown in FIG. 4A, computing device 20 is capable of sending graphics instructions, state/performance information, and mapping/partitioning information to each of computing devices 40A-40N. For example, computing device 20 may send graphics instructions 30 (FIG. 1), state/performance information 32, and mapping/partitioning information 33 to computing devices 40A-40N (which it previously received from graphics device 2). Each computing device 40A-40N may be able to use the received instructions and information to create a visual representation of the rendered image data, and also to display state and performance information. In some cases, each computing device 40A-40N may display a representation of graphical partitions that overlay a graphical scene, such that an artist is able to view a display of the partitions, and how such partitions divide the scene. In addition, each computing device 40A-40N may also analyze the received information to map graphics instructions that are associated with any identified performance issues to specific portions of the original, primitive graphics data that was created by the corresponding artist. In this manner, an artist is able to review performance information based upon instruction execution, and is also to quickly identify which portions of the graphics data created by the artist is associated with, or may the cause of, particular performance issues. Performance issues may relate to the size of certain textures, the size of certain polygons, the amount of blending, or the like.

Any individual artist may wish to make one or more modifications to these identified portions of the graphics data. For example, if an identified performance issue relates to the size of a texture, the artist may wish to adjust the texture. If another identified performance issue relates to the size of a particular polygon, the artist may choose to split the polygon, delete the polygon, or move the polygon in an effort to address, resolve, or otherwise mitigate the performance issue. Any changes may be sent back to application computing device 20, which may then include such changes within requested modifications 34 that are sent back to graphics device 2 for processing (such as was described previously).

Upon receipt of updated instructions/information 35 from graphics device 2, computing device 20 may analyze such information, and may also provide updated instructions/information to the remote computing device (e.g., device 40A) that sent the requested modification. The updated instructions/information may include updated mapping information. In this example, computing device 20 and/or 40A may use or analyze the updated instructions/information to determine if the performance issue has been resolved or otherwise mitigated. In some cases, computing device 20 may send computing device 40A an indication as to whether the performance issue has been resolved. In such fashion, an artist may determine whether any requested changes to the original graphics data may have resolved the performance issue in an efficient fashion by automatically receiving data from computing device 20 and graphics device 2. If the performance issue has not been mitigated or fully resolved, the updated instructions/information may include updated mapping information that may be used to identify specific portions of the graphics data that is associated with the unresolved problem, such that the artist may attempt to continue to make modifications to the graphics data in an iterative fashion to resolve the problem.

Figure 4B:
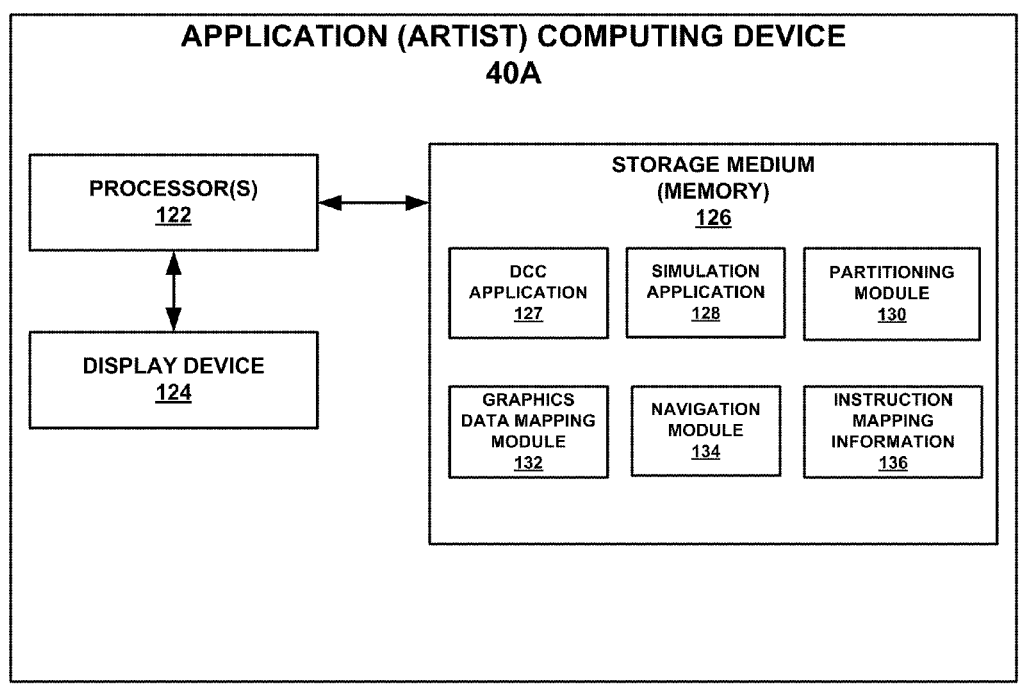
FIG. 4B is a block diagram illustrating additional details of one of the additional application computing devices shown in FIG. 4A, according to one aspect of the disclosure.

FIG. 4B is a block diagram illustrating additional details of one of the additional application computing devices 40A shown in FIG. 4A, according to one aspect. In some cases, each of the computing devices 40A-40N shown in FIG. 4A may have a similar design to the one shown in FIG. 4B.

In the example of FIG. 4B, application computing device 40A, which may be used by a graphics artist, has a similar design to application computing device 20 shown in FIG. 1. In some cases, computing device 40A may comprise a personal computing device, such as a laptop or desktop computer. An artist may use computing device 40A to create original, primitive graphics data, such as polygon and/or texture data, which may be incorporated into a graphics scene (e.g., 3D scene) in a graphics application.

As shown in FIG. 4B, computing device 40A includes one or more processors 122 and a display device 124. Display device 124 may be any device capable of displaying image data for display purposes, such as an LCD (liquid crystal display), plasma display device, or other television (TV) display device. Computing device 40A also includes storage medium 126, which may comprise memory. Storage medium 126 may include any permanent or volatile memory that is capable of storing instructions and/or data, such as, for example, synchronous dynamic random access memory (SDRAM), read-only memory (ROM), non-volatile random access memory (NVRAM), embedded dynamic random access memory (eDRAM), static random access memory (SRAM), or flash memory.

Storage medium 126 may include a DCC (digital content creation) application 127 that, when executed by processors 122, allow the artist to create graphics data that is displayed on display device 124. Storage medium 126 also includes a simulation application 128, a partitioning module 130, a graphics data mapping module 132, a navigation module 134, and instruction mapping information 136. These modules and data stores are similar to simulation application 28 (FIG. 1), partitioning module 27, graphics data mapping module 25, navigation module 29, and instruction mapping information 31. Thus, computing device 40A may function in a similar fashion to computing device 20 when processing graphics instructions, state/performance information, and mapping/partitioning information, and also when creating requested modifications. In computing device 40A, these functions may also be incorporated with DCC application 127, such that an artist may view the graphics and performance information, as well as make requested modifications, in conjunction with the use of the DCC tool that is used to create and modify graphics data. Thus, if an artist makes any changes to graphics data within the DCC tool, these changes can be processed as requested modifications that are sent back to computing device 20.

FIG. 5 is a conceptual diagram illustrating exemplary mapping between individual graphics instructions and graphics data, according to one aspect. In the example of FIG. 5, it is assumed that the indicated graphics instructions 30A-30N are part of graphics instructions 30 shown in FIG. 1. The exemplary mapping shown in FIG. 5 may be captured as mapping information within graphics data mapping information 23 of graphics device 2, in one aspect.

As is shown in FIG. 5, individual graphics instructions 30A-30G may be associated with, and thereby mapped to, graphics data 140. For example, graphics instructions 30A-30G may be bound to graphics data 140 within a graphics application, and may comprise draw instructions that render graphics data 140 into image data upon execution. In some cases, graphics data mapping information 23 may include information that maps graphics instructions 30A-30G to graphics data 140. In the example of FIG. 5, graphics data 140 comprises primitive graphics data that includes polygon (e.g., triangle) data 142 and texture data 144. Texture data 144 may include textures for polygons that are defined within polygon data 142. Polygon data 142 and texture data 144 may comprise constituent portions of graphics data 140 that is included within a graphics scene, such as a 3D graphics scene.

As is evident from the conceptual diagram shown in FIG. 5, application computing device 20 and/or application computing devices 40A-40N may use mapping information to map graphics instructions 30A-30G to graphics data 140. Thus, for example, if graphics instructions 30A-30G are associated with a particular performance issue during instruction execution to render image data, the mapping information identifies graphics data 140 as original, primitive graphics data that may also be associated with, or a cause of, the performance issue. If, for instance, the performance issue relates to an excess of texturing or over-sized polygons, graphics data 140 may be the cause of the excessive texturing (e.g., within texture data 144) or the over-sized polygons (e.g., within polygon data 142). An artist who has created or generated graphics data 140 may be able to review the performance issue, as well as the identified graphics data 140, in order to resolve the issue, such as by adjusting the texture data 144 or changing the sizes of one or more polygons within polygon data 142.

FIG. 5 also shows that graphics instructions 30H-30N are mapped to graphics data 146, which is separate from graphics data 140. Graphics instructions 30H-30N are therefore associated with the polygon data 148 and texture data 150 included within graphics data 146.

Figure 6:
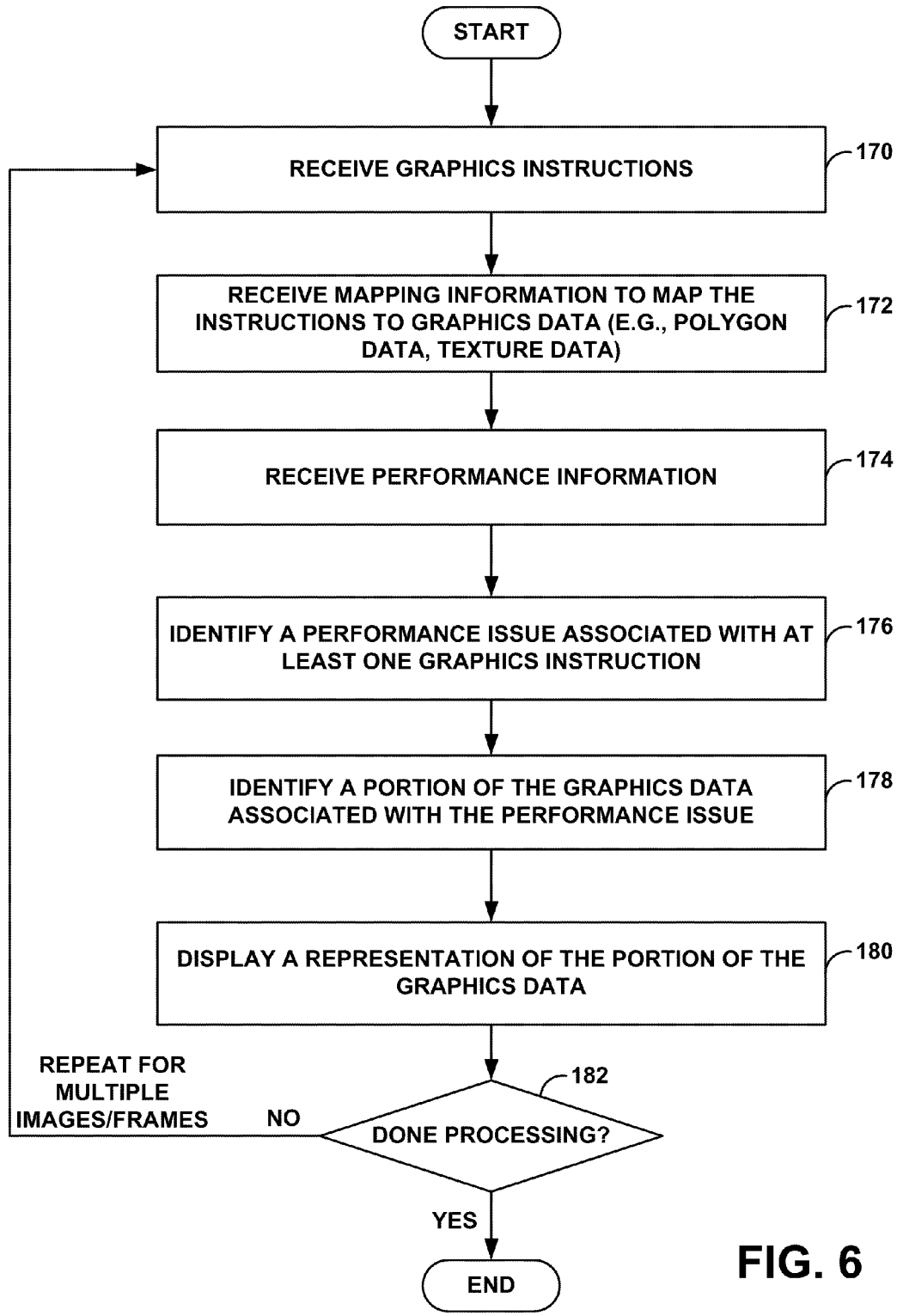
FIG. 6 is a flow diagram of a first method that may be performed by the application computing device shown in FIG. 1 or by any one of the application computing devices shown in FIG. 4A, according to one aspect of the disclosure.

FIG. 6 is a flow diagram of a first method that may be performed by application computing device 20 (FIG. 1) or by any one of application computing devices 40A-40N (FIG. 4A), according to one aspect. For purposes of illustration only, it will be assumed that the method is performed by application computing device 20.

Application computing device 20 may receive graphics instructions 30 from an external device, such as graphics device 2 (170). Graphics instructions 30 are executed by graphics device 2 to render image data from primitive graphics data and to display one or more graphics images, such as three-dimensional (3D) graphics images, on display device 6. In one aspect, graphics instructions 30 comprise a call stream that, when executed, renders the graphics images. In one aspect, the call stream comprises binary instructions generated from application programming interface (API) instructions.

Computing device 20 may also receive mapping/partitioning information 33 from graphics device 2, which includes information to map graphics instructions 30 to primitive graphics data that is used to render graphics images during execution of graphics instructions 30 (172). The primitive graphics data may comprise at least one of polygon data and texture data that comprise constituent segments of a graphical scene.

The mapping information may comprise information that maps at least one graphics instruction within graphics instructions 30 to a portion of the primitive graphics data that is used to render one or more graphics images during the execution of the at least one graphics instruction. Computing device 20 may receive state/performance information 32 from graphics device 2 (174). State/performance information 32 is associated with execution of graphics instructions 30 on graphics device 2. State/performance information 32 may include performance information that is associated with the execution of at least one of graphics instructions 30 and a portion of the primitive graphics data.

State/performance information 32 may also include state information that indicates one or more states of graphics device 2 as it renders a graphics image. The state information may include state information from one or more processors of graphics device 2 that execute graphics instructions 30, such as control processor 10, graphics processor 12, vertex processor 14, and/or display processor 16. In some cases, the state information may comprise the primitive graphics data, such as primitive polygon data that is used by graphics processor 12 in graphics device 2 to render graphics image data.

Computing device 20 may display a representation of one or more graphics images based on graphics instructions 30 and the state/performance information 32 in a graphical scene. In such fashion, computing device 20 is capable of displaying a representation of these graphics images within a simulated environment that simulates graphics device 2. The simulated environment may be provided via execution of simulation application 28 on processors 22 of computing device 20.

Computing device 20 may identify a performance issue associated with execution of at least one of graphics instructions 30 (176). This performance issue may be associated with increased processor utilization caused, for example, by excessively large polygons, excessive texturing, excessive blending, or the like. When, in some cases, the portion of the primitive graphics data comprises one or more polygons, computing device 20 may use the received mapping information to identify the one or more polygons that are associated with the performance issue based upon the execution of at least one of the associated graphics instructions 30 as specified by the mapping information. Computing device 20 may analyze any received performance information from graphics device 2 to identify the performance issue associated with the portion of the primitive graphics data, in some cases.

Computing device 20 may then use the mapping information to identify a portion of the primitive graphics data that is associated with the performance issue based upon execution of the at least one graphics instruction (178). In addition, computing device 20 may display, on display device 24, a representation of the portion of the graphics data that is associated with the performance issue based upon at least one graphics instruction within instructions 30 and any received state information (180).

In one aspect, computing device 20 may use navigation module 29 (FIG. 1) to display a navigation controller on display device 24. The user may interact with the navigation controller that is displayed via an on-screen graphical user interface. This graphical user interface may receive user input to interact with the navigation controller. Computing device 20 may display, on display device 24, a modified perspective view of the representation of the portion of the primitive graphics data based upon the user input.

The receiving of graphics instructions (170), receiving of mapping information (172), receiving of performance information (174), identifying of a performance issue (176), identifying a portion of the graphics data (178), and the displaying (180) may be repeated for multiple images or image frames (182). As the graphics images change, or as alternate perspective views of the images are shown in multiple frames, the user (e.g., application developer) can continuously ascertain the relationship between the graphics data associated with the images and any identified performance issues during instruction execution. The user may then take appropriate action in an attempt to mitigate or resolve these issues.

Figure 7:
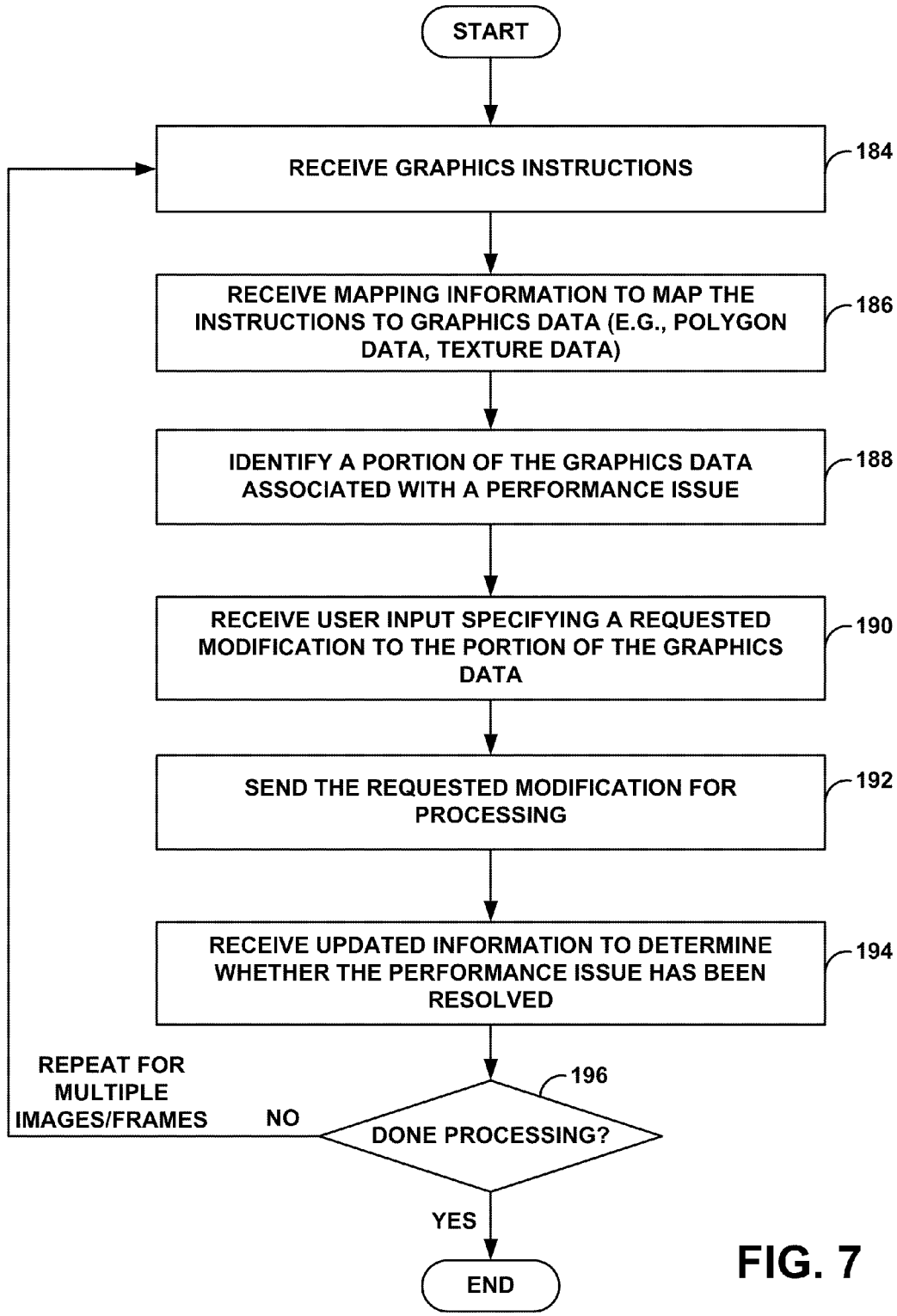
FIG. 7 is a flow diagram of a second method that may be performed by the application computing device shown in FIG. 1 or by any one of the application computing devices shown in FIG. 4A, according to one aspect of the disclosure.

FIG. 7 is a flow diagram of a second method that may be performed by application computing device 20 (FIG. 1) or by any one of application computing devices 40A-40N (FIG. 4A), according to one aspect. For purposes of illustration only, it will be assumed that the method shown in FIG. 7 is performed by application computing device 40A.

As is shown in FIG. 7, application computing device 40A may receive graphics instructions from an external device, such as application computing device 20 (184). Computing device 20 may send these instructions to computing device 40A based upon the graphics instructions 30 that it receives from graphics device 2.

Computing device 40A may also receive mapping information from computing device 20 to map the instructions received from computing device 20 to graphics data, such as polygon data or texture data (186). Computing device 20 may send this mapping information to computing device 40A based upon the mapping/partitioning information 33 that it receives from graphics device 2.

Upon receipt of the graphics instructions and the mapping information, computing device 40A may use the received mapping information to identify a portion of the graphics data that is associated with a performance issue (188). Computing device 40A may identify the performance issue based upon the received graphics instructions and/or other information that is received from computing device 20, such as state/performance information or partitioning information. In one aspect, when computing device 20 may identify the performance issue based upon graphics instructions 30, state/performance information 32, and/or mapping/partitioning information 33, computing device 20 may send computing device 40A an indication of the performance issue associated with the portion of the primitive graphics data.

Computing device 40A may receive user input, such as from an artist using computing device 40A, that specifies a requested modification to the portion of the primitive graphics data (190). Computing device 40A may send the requested modification to computing device 20 for processing (192). Upon receipt of the requested modification, computing device 20 may include the requested modification within requested modifications 34 that it sends to graphics device 2. After computing device 20 receives updated instructions/information 35 from graphics device 2, which may include updated performance information associated with the requested modification, computing device 20 may provide updated instructions/information to computing device 40A.

Computing device 40A may receive the updated instructions/information, which may include updated performance information, to determine whether the performance issue has been resolved (194). The updated performance information is associated with the requested modification previously sent by computing device 40A to computing device 20. Either or both of computing device 20 and computing device 40A may analyze the updated performance information to determine whether the performance issue has or has not been resolved. In some cases, computing device 20 may send an indication to computing device 40A indicating whether or not the issue has been resolved.

The updated instructions/information sent by computing device 20 and received by computing device 40A may include at least one updated graphics instruction that is associated with the requested modification. In addition, the updated instructions/information may also include updated mapping information that includes updated information to map the at least one updated graphics instruction to a second portion of the primitive graphics data that is associated with the execution of the at least one updated graphics instruction. In such fashion, an artist may be able to identify the second portion of the primitive graphics data of note, which may be different from the first portion. The second portion of the primitive graphics data may, in some cases, be associated with the same or different performance issue to be addressed by the artist.

In one aspect, computing device 40A may display, on display device 124, a representation of the portion of the primitive graphics data that is associated with the performance issue based upon the at least one graphics instruction, and may also display a representation of partitions that overlay the portion of the primitive graphics data. Computing device 40A may, in some cases, use portioning information that it receives from computing device 20 in order to display the representation of the partitions. Computing device 40A may analyze the portion of the primitive graphics data to determine whether the portion of the primitive graphics data is associated with multiple ones of the partitions.

In some cases, the portion of the primitive graphics data may includes a plurality of triangles, and computing device 40A may determine which ones of the triangles span across the multiple ones of the partitions. Computing device 40A may display a graphical representation of the triangles that span across the multiple ones of the partitions on display device 124.

The receiving of graphics instructions (184), receiving of mapping information (186), identifying of a portion of graphics data (188), receiving user input (190), sending of a requested modification (192), and receiving updated information (194) may be repeated for multiple images or image frames (196). As the graphics images change, or as alternate perspective views of the images are shown in multiple frames, the user (e.g., artist) can continuously ascertain the relationship between the graphics data associated with the images and any identified performance issues during instruction execution. The user may then take appropriate action in an attempt to mitigate or resolve these issues.

Figure 8:
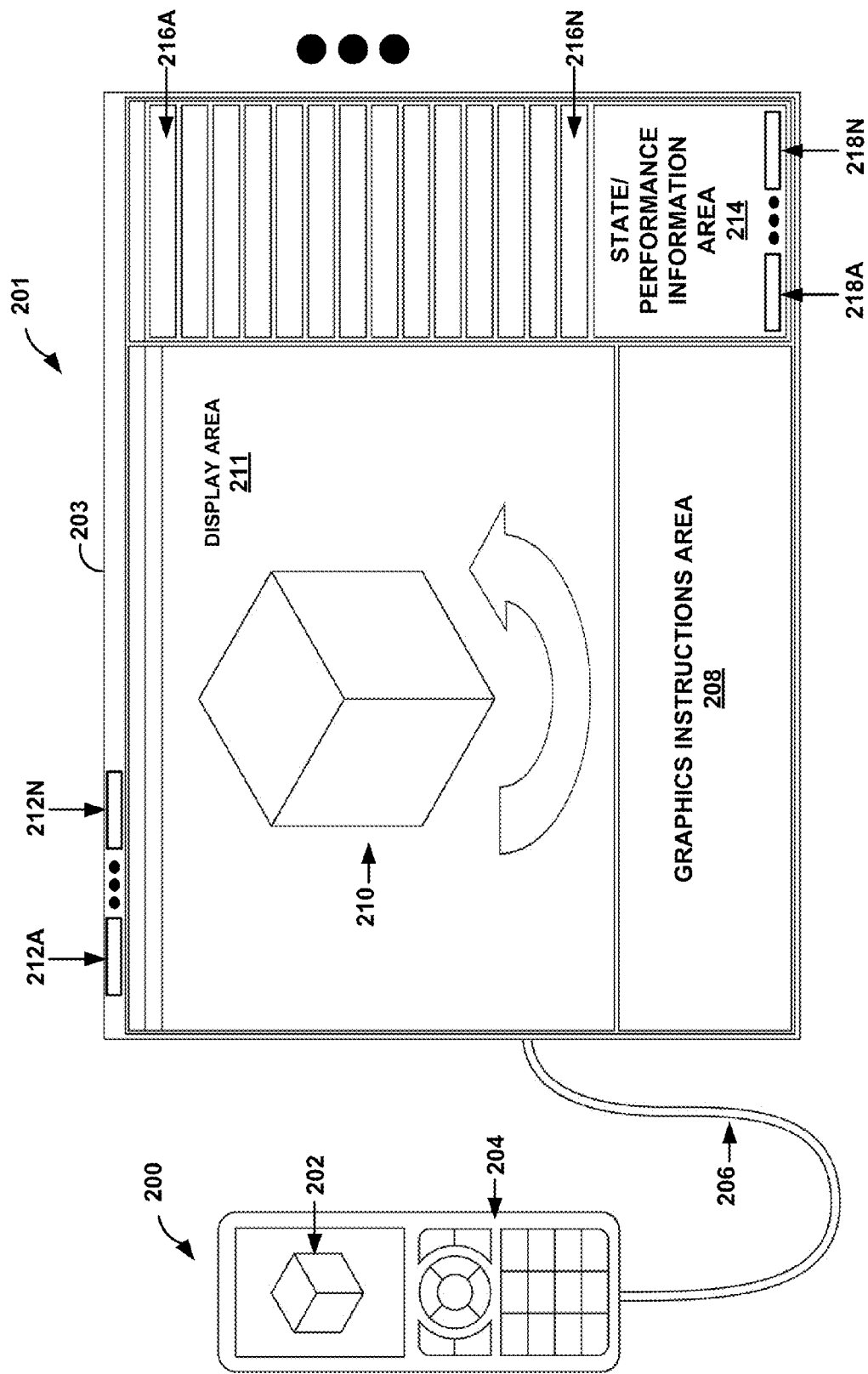
FIG. 8 is a conceptual diagram illustrating an example of a graphics device that is coupled to a display device for displaying information in a graphic window, according to one aspect of the disclosure.

FIG. 8 is a conceptual diagram illustrating an example of a graphics device 200 that is coupled to a display device 201 for displaying information in a graphic window 203, according to one aspect. If, for example, graphics device 200 is part of graphics device 2 (FIG. 1), display device 201 may be part of graphics device 24 in application computing device 20. Graphics device 200 is capable of displaying a 3D graphics image 202. Display device 201 is capable of displaying, within window 203, a 3D graphics image 210, which is a re-creation of graphics image 202, based upon graphics instructions and state/performance information that is sent from graphics device 200. Display device 201 is also capable of displaying visual representations of these instructions and state/performance information, such that a developer may change these instructions and information to modify graphics image 210 or an entire scene that includes graphics image 210. Display device 201 may be included within any type of computing device (not shown) that is coupled to graphics device 200 and is capable of receiving such instructions and state/performance information from graphics device 200. (For purposes of simplicity, the computing device that includes display device 201 has been omitted from the conceptual diagram shown in FIG. 9.)

As described previously, graphics device 200 is capable of display 3D graphics image 202 (which is a cube in the example of FIG. 8). Graphics device 200 also has a keypad 204. A user may interact with keypad 204 to manipulate graphics device 200. Keypad 204 may include a number of keys and/or buttons. Graphics device 200 is capable of sending graphics instructions and state/performance information to a device (e.g., application computing device 20) that includes graphics device 201 via connector 206. In one aspect, connector 206 comprises a Universal Serial Bus (USB) connector. In other aspects, different forms of connectors may be used. In some aspects, wireless communication may replace connector 206.

As shown in the example of FIG. 8, display device 201 may display various types of information within a graphical user interface. In this example, display device 201 displays graphical window 203 within the graphical user interface. Window 203 includes a display area 211, a graphics instructions area 208, and a state/performance information area 214. Display area 211 includes 3D graphics image 210, which, as described previously, is a re-creation of 3D graphics image 202. In this example, 3D graphics image comprises a cube. The information displayed on display device 201 comprises a representation, or simulation, of information displayed on graphics device 202 for purposes of debugging and testing, according to one aspect.

Graphics instructions area 208 includes a visual representation of one or more graphics instructions that have been received from graphics device 200. As described previously, the visual representation of such instructions may comprise a representation of such instructions. For example, if graphics device 200 sends binary graphics instructions, display device 201 may display a representation of such binary instructions in another form, such as higher-level application programming interface (API) instructions (e.g., OpenGL instructions). Mapping information (such as mapping information 31 shown in FIG. 1) may be used to map received binary instructions into another format that may be displayed within graphics instructions area 208.

State/performance information area 214 includes a visual representation of state and/or performance information that has been received from graphics device 200. The received graphics instructions and state/performance information may be used to display 3D graphics image 210 within display area. In one aspect, graphics device 200 may utilize a graphics driver that implements a state/performance data module (such as state/performance data module 116 shown in FIG. 3) to provide various state and/or performance data. The received state/performance information may include graphics data (e.g., primitive data and/or rasterized data).

Window 203 also includes one or more selectors 212A-212N. A user may select any of these selectors 212A-212N. Each selector 212A-212N may be associated with different functions, such as statistical and navigation functions, as will be described in more detail below. Window 203 further includes selectors 216A-216N and 218A-218N, each of which may be selected by a user. Each selector 216A-216N and 218A-218N may also be associated with different functions, such as metric functions, override functions, and/or texture functions, as will be described in more detail below in reference to FIG. 9.

A user, such as an application developer, may change information displayed within window 203. For example, the user may modify one or more of the instructions displayed within graphics instructions area 208, or any of the state/performance information within state/performance information area 214.

Any changes initiated by the user within window 203 may then be sent back to graphics device 200 as requested modifications. Graphics device 200 may then process these modifications, and provide updated instructions and/or information which may then be displayed within graphics instructions area 208 and/or state/performance information area 214. The updated instructions and/or information may also be used to display a modified version of 3D graphics image 210 within display area 211.

In one aspect, the state and/or performance information that may be displayed within area 214 may be analyzed by the computing device that includes display device 201 (such as application computing device 20 shown in FIG. 1) to identify potential bottlenecks during execution of the graphics instructions on graphics device 200. Ultimately, a user, such as an application developer, may wish to view the information presented in window 203 during a debugging process to optimize the execution of graphics instructions on graphics device 200. As described previously, bottlenecks may be introduced anywhere within the graphics processing pipeline in graphics device 200, and it may be difficult for an application developer to isolate such bottlenecks for performance optimization. Through analysis of state and/or performance information, potential bottlenecks and possible workarounds can be displayed in window 203, such as within one or more sub-windows or pop-up windows, or within area 214 of window 203.

In one aspect, window 203 may display a report on the bottlenecks encountered in the call-stream of the graphics instructions received from graphics device 200, and may also display possible workarounds. In some cases, these possible workarounds may be presented as "what-if" scenarios to the user. For example, rendering a non-optimized triangle-list in a call-stream may be presented as one possible scenario, while pre-processing that list through a triangle-strip optimization framework may be presented as a second possible scenario. The user may select any of these possible workaround scenarios as requested modifications, and the requested modifications are then transmitted back to graphics device 200, where the performance may be measured. Graphics device 200 then sends updated instructions/ information, which may be presented within graphics instruction area 208 and/or state/performance information area 214. The user can then view the results, and compare results for different potential workarounds to identify an optimum solution. The user can use this process to quickly identify a series of steps that can be taken in order to remove bottlenecks from their application.

In one aspect, window 203 may display information for graphics data that is associated with a performance issue. For example, a computing device (e.g., application computing device 20) that includes display device 201 may receive mapping information from graphics device 200 that includes information to map graphics instructions to primitive graphics data that is used to render graphics image 210 during execution of the instructions. The computing device may identify a performance issue associated with execution of at least one of the graphics instructions, and use the mapping information to identify a portion of the graphics data that is associated with the performance issue. A performance issue may, in some cases, relate to the size of certain textures, the size of certain polygons, the amount of blending, or the like. The portion of the graphics data may comprise polygon or texture data that may be related to a cause of the performance issue. Graphics device 201 may display a representation of the portion of the graphics data within window 203 to highlight which portion is related to the identified performance issue. For example, if the portion of the graphics data is a portion that is used to render graphics image 210, graphics device 201 may display graphics image 210 within display area 211, in one aspect, to indicate that the graphics data that is the source of image 210 is associated with the identified performance issue.

The application developer may choose to make modifications to the portion of the graphics data or associated image 210 in an attempt to mitigate or resolve the performance issue. For example, the developer may modify one or more of the instructions shown in instructions area 208, the information shown in state/performance information area 214, or a perspective view of image 210. In some cases, the developer may modify textures associated with image 210, or may modify the polygon data associated with image 210. These requested modifications are sent to graphics device 200, which processes the requested modifications and sends back updated instructions/information, including updated mapping and/or performance information. Graphics device 201 may then display updated information related to the graphics data associated with image 210 and display an updated view of image 210 within display area 211 to provide an indication as to whether the performance issue has been resolved.

The user may iteratively continue to make adjustments within window 203 for purposes of experimentation, or trial/error debugging. The user may experiment with different forms or combinations of graphics instructions and state/performance information to identify changes in the images or scenes that are displayed within display area 211. The user can use the simulation environment provided by the contents of window 203 to interactively view and modify the graphics instructions, which may be part of a call-stream, and states provided by graphics device 200 without having to recompile any source code and re-execute the compiled code on graphics device 200.

In some cases, the user may manipulate one or more of buttons 212A-212N to manipulate a graphical navigation controller, such as graphical camera, to modify a perspective view of graphics image 210. Such manipulation may be captured as requested modifications that are then sent back to graphics device 200. The updated instructions/information provided by graphics device 200 is then used to modify the perspective view of graphics image 210.

In some cases, various texture and/or state information may be provided in area 214 of window 203 as modifiable entities. In addition, a user may even select, for example, a pixel of graphics image 210 within display area 211, such that one or more corresponding instructions within graphics instruction area 208 are identified. In this fashion, a user can effectively drill backwards to a rendering instruction or call that was used to render or create that pixel or other portions of graphics image 210. Because graphics device 201 may re-create image 210 in window 203 exactly as it is presented on graphics device 200, the user is able to quickly isolate issues in their application (which may be based on the various graphics instructions displayed in graphics instructions area 208), and modify any states within state/performance area 214 to prototype new effects.

In one aspect, display device 201 is also capable of displaying partitioning information, as well as polygon data that may span across multiple partitions. For example, the application developer may select a button, such as one of buttons 212A-212N, to cause display device 201 to display a graphical representation of partitions (e.g., rectangular-shaped partitions) that overlay image 210 and graphically divide the scene in display area 211. In some cases, when device 200 is part of graphics device 2, the displayed partitions may be based on received mapping/partitioning information 33 (FIG. 1). The device that includes display device 201 may also analyze graphics data (e.g., polygon data) for graphics image 210 to determine which portions of the graphics data are associated with multiple ones of the partitions. For example, if multiple polygons were used to render graphics image 210, the device may analyze the polygons to determine which ones of these polygons span across multiple partitions.

Figure 9:
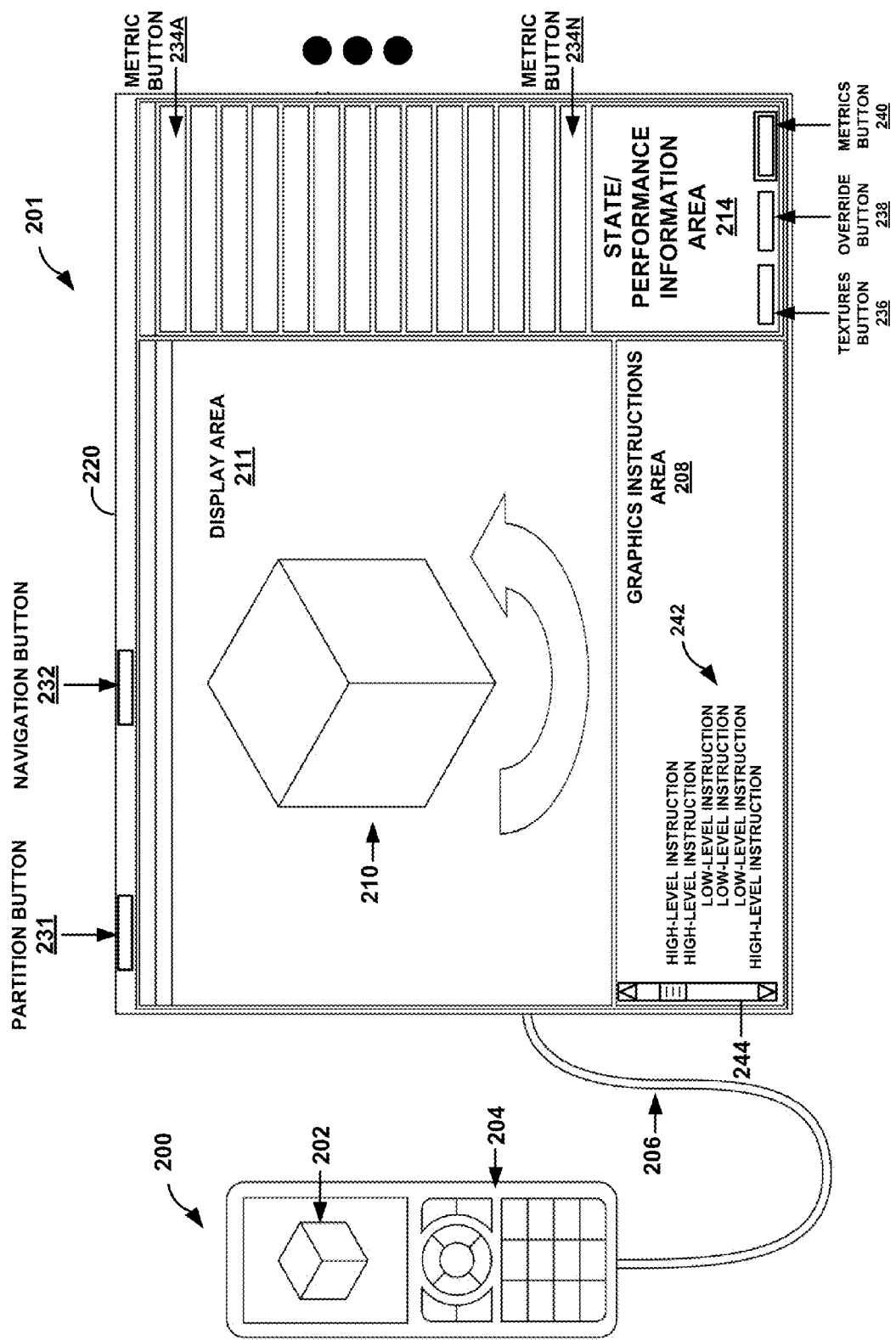
FIG. 9 is a conceptual diagram illustrating another example of a graphics device coupled to a display device that displays information within a graphical window, according to one aspect of the disclosure.

FIG. 9 is a conceptual diagram illustrating another example of graphics device 200 coupled to display device 201 that displays information within graphical window 220, according to one aspect. In this aspect, window 220 includes various instruction information as well as metric information.

For example, within graphics instructions area 208, various graphics instructions 242 are shown. Graphics instructions 242 may be a subset of graphics instructions that are provided by graphics device 200. For example, if graphics device 200 is part of graphics device 2, graphics instructions 242 may be a subset of graphics instructions 30. In some cases, mapping information (such as mapping information 31 shown in FIG. 1) may be used to map incoming instructions received from graphics device 200 to a visual representation of these instructions, materialized as instructions 242 that are displayed within graphics instructions area 208. For example, if the received instructions are in binary form, instructions 242 may comprise API instructions that were used to generate the instructions in binary form.

As is shown in the example of FIG. 9, graphics instructions 242 include both high-level instructions and low-level instructions. A user, such as an application developer, may use scrollbar 244 to view the full-set of instructions 242. Certain high-level instructions may include one or more low-level instructions, such as lower-level API instructions. The application developer may, in some cases, select (e.g., such as by clicking) on a particular high-level instruction in order to view any low-level instructions that are part of, or executed by, the associated high-level instruction. As described previously, received graphics instructions, such as instructions 242, are used to generate the representation of graphics image 202, which comprises graphics image 210 shown in display area 211 of window 220. Mapping information may map any one or more of instructions 242 to portions of graphics data that may be associated with, or a potential cause of, one or more performance issues.

Various selection buttons are shown below state/performance information area 214 in FIG. 9. These selection buttons include a textures button 236, an override button 238, and a metrics button 240. In the example of FIG. 9, the application developer has selected the metrics button 240. Upon selection of this button, various metrics options may be displayed. For example, one or more metric buttons 234A-234N may be displayed above state/performance area 214. Each metric button 234A-234N may be associated with a particular metric. In some cases, one or more of these metrics may be predefined or preconfigured metric types, and in some cases, the application developer may select or customize one or more of the metrics. Example metrics may include, for example, any one or more of the following: frames per second, percent (%) busy (for one or more processors), metrics associated with the amount of use of a bus or memory, vertices per second, triangles per second, pixel clocks per second, fragments per second, etc. The application developer may select any of metric buttons 234A-234N to view additional details regarding the selected metrics.

For example, if metric button 234A is associated with the number of frames per second, the application developer may select metric button 234A to view additional details on the number of frames per second (related to performance) for graphics image 210, or select portions of graphics image 210. The developer may, in some cases, select metric button 234A, or drag metric button 234A into state/performance information area 214. The detailed information on the number of frames per second may be displayed within state/performance information area 214. The developer also may drag metric button 234A into display area 211, or select a portion of graphics image 210 for application of metric button 234A. For example, the developer may select a portion of graphics image 210 after selecting metric button 234A, and then detailed information on the number of frames per second for that selected portion may be displayed within state/performance information area 214. In such fashion, the developer may view performance data for any number of different metric types based upon selection of one or more of metric buttons 234A-234N, and even possible selection of graphics image 210 (or a portion thereof).

In one aspect, metric data that may be displayed within window 220 may be provided by a graphics driver (e.g., graphics driver 18 shown in FIG. 3) of graphics device 200. This graphics driver may implement a hardware counter module (e.g., hardware counter module 114 of FIG. 3) and/or a processor usage module (e.g., processor usage module 112 of FIG. 3) to provide various data that may then be displayed as metric data within window 220.

The developer may, in some cases, also select textures button 236. Upon selection, various forms of texture information related to graphics image 210 may be displayed by graphics device 201. For example, texture information may be displayed within window 220, such as within state/performance information area 214. In some cases, the texture information may be displayed within an additional (e.g., pop-up) window (not shown). The developer may view the displayed texture information, but may also, in some cases, modify the texture information. In these cases, any modifications to the texture information may be propagated back to graphics device 200 as requested modifications. Upon receipt of updated instructions/information from graphics device 200, changes to graphics images 210 may be displayed within display area 211. FIG. 11 includes certain texture information that may be displayed upon selection of textures button 236.

The developer may desire to modify texture information associated with graphics data used to generate image 210 if received mapping information has identified that this graphics data is associated with a performance issue during execution of one or more of instructions 242 (or the binary source instructions for instructions 242). If the source graphics data that is used to render image 210 during instruction execution, which may include polygon and texture data, is the potential source of a performance problem, the developer may wish to modify the texture data and/or the polygon data.

The developer may, in some cases, also select override button 238. After selection of override button 238, certain information, such as instruction and/or state information, may be displayed (e.g., within window 220 or another window) which may be modified, or overridden, by the developer. Any modifications or overrides may be included within one or more requested modifications that are sent to graphics device 200. In one aspect, graphics device 200 may implement a graphics driver, such as graphics driver 18A (FIG. 3), to process any requested modifications. For example, graphics device 200 may use override module 120 to process such requested modifications that comprise one or more overrides.

In some cases, the developer may override one or more over graphics instructions 242 that are shown within graphics instructions area 208. In these cases, the developer may type or otherwise enter information within graphics instructions area 208 to modify or override one or more of graphics instructions 242. These modifications may then be sent to graphics device 200, which will provide updated instructions/information to update the display of graphics image 210 within display area 211. The developer may change, for example, parameters, ordering, type, etc., of graphics instructions 242 to override one or more functions that are provided by instructions 242. In one aspect, mapping information 31 (FIG. 1) may be used to map, or convert, changes to graphics instructions 242 into corresponding instructions of another format (e.g., binary instructions) that may then be provided to graphics device 200.

In some cases, the developer may also select override button 238 to override one or more functions associated with the processing pipeline that is implemented by graphics device 200. FIG. 12 shows an example of an override screen that may be displayed to the developer upon selection of override button 238.

Window 220 further includes selection buttons 231 and 232. Selection button 231 is a partition button, and selection button 232 is a navigation button. The developer may select partition button 231 to view a graphical representation of partitions, such as rectangular-shaped partitions, that overlay graphics image 210 and graphically divide the scene displayed in display area 211. Upon user selection of partition button 231, the graphical partitions may be displayed in display area 211.

Display area 211, or a separate display area or window, may also display information based upon an analysis of graphics data for graphics image 210 that determines which portions of the data are associated with multiple partitions. For example, display area 211, or a separate display area or window, may display which polygons, which are used to render graphics image 210, span across multiple partitions in conjunction with the graphical representation of the partitions. In some cases, a graphical indication, such as a color, may be displayed for each polygon (e.g., triangle) that spans across multiple partitions.

For example, in one aspect, a "heat map" may be displayed, where each triangle is displayed in a particular color. Triangles that do not span across multiple partitions may be displayed in one color (e.g., blue). Triangles that span across multiple partitions (e.g., two to three partitions) may be displayed in a second color (e.g., purple). Triangles that span across more than three partitions may be prominently displayed in a third color (e.g., red). Thus, in this example, an application developer can quickly determine which triangles span across multiple partitions, and which ones span across more partitions than others. The developer may be able to use this information to determine how to reconfigure, redefine, or otherwise restructure triangles that span across multiple partitions to reduce performance (e.g., rendering) overhead when generating graphics image 210.

The developer may also select navigation button 232 to navigate within display area 211, and even possibly to change a perspective view of graphics image 210 within display area 211. For example, upon selection of navigation button 232, a 3D graphical camera or navigation controller may be displayed. The developer may interact with the controller to navigate to any area within display area 211. The developer may also use the controller to change a perspective view of graphics image 210, such as by rotating graphics image 210 or zooming in/out.

In one aspect, any developer-initiated changes through selection of navigation button 232 and interaction with a graphical navigation controller may be propagated back to graphics device 200 as requested modifications (e.g., part of requested modifications 84 shown in FIG. 1). Updated instructions/information then provided by graphics device 200 may then be used to update the display (e.g., perspective view) of graphics image 210. In addition, updated instructions may be displayed within graphics instructions area 208. Updated state/performance information may be displayed within state/performance information area 214.

In one aspect, a graphical partition may be displayed and overlaid upon a modified perspective view of graphics image 210. In addition, graphics data contained within the updated instructions/information for the modified perspective view of the graphics image 210 may be analyzed to determine which portions of the data are associated with multiple partitions.

As a result, the developer may effectively and efficiently determine how alternate perspectives, orientations, views, etc., for rendering and displaying graphics image 210 may affect performance and state of graphics device 200. This may be very useful to the developer in optimizing the graphics instructions 242 that are used to create and render graphics image 210 in the simulation environment displayed on display device 201, and effectively of graphics image 202 that is displayed on graphics device 200. In one aspect, any changes in the position, perspective, orientation, etc., of graphics image 210, based upon developer-initiated selections and controls within window 220, may also be seen as changes for graphics image 202 that may be displayed on graphics device 200 during the testing process.

Through interaction with graphical window 220 within a graphical user interface, the application developer can attempt to identify performance issues and/or bottlenecks during execution of graphics instructions 242, which are a visual representation of graphics instructions that are executed by graphics device 200 to create graphics image 202. A representation of graphics image 202 (i.e., graphics image 210) is displayed within display area 211 based upon graphics instructions 242 and state/performance data received by graphics device 200. By viewing graphics instructions 242, graphics image 210, and the state/performance information, as well as the effects that are based upon user-initiated modifications to one or more of these, an application developer can interactively and dynamically engage in a trial-and-error, or debugging, process to optimize the execution of instructions on graphics device 200, and to eliminate or mitigate any performance issues (e.g., bottlenecks) during instruction execution.

In addition, the visual representation of a graphical scene that includes a number of different graphical partitions may allow a developer to identify portions of the graphics scene that exhibit reduced performance due to costs that may be associated with screen partitioning. The developer may review the partitioning and associated analysis information to investigate alternate compositions of the scene to help reduce these costs and/or related performance overhead. In addition, the developer may identify specific portions of graphics data that may be associated with performance issues. This may allow the developer to engage in focused efforts to modify the graphics data in an attempt to resolve these issues.

Figure 10:
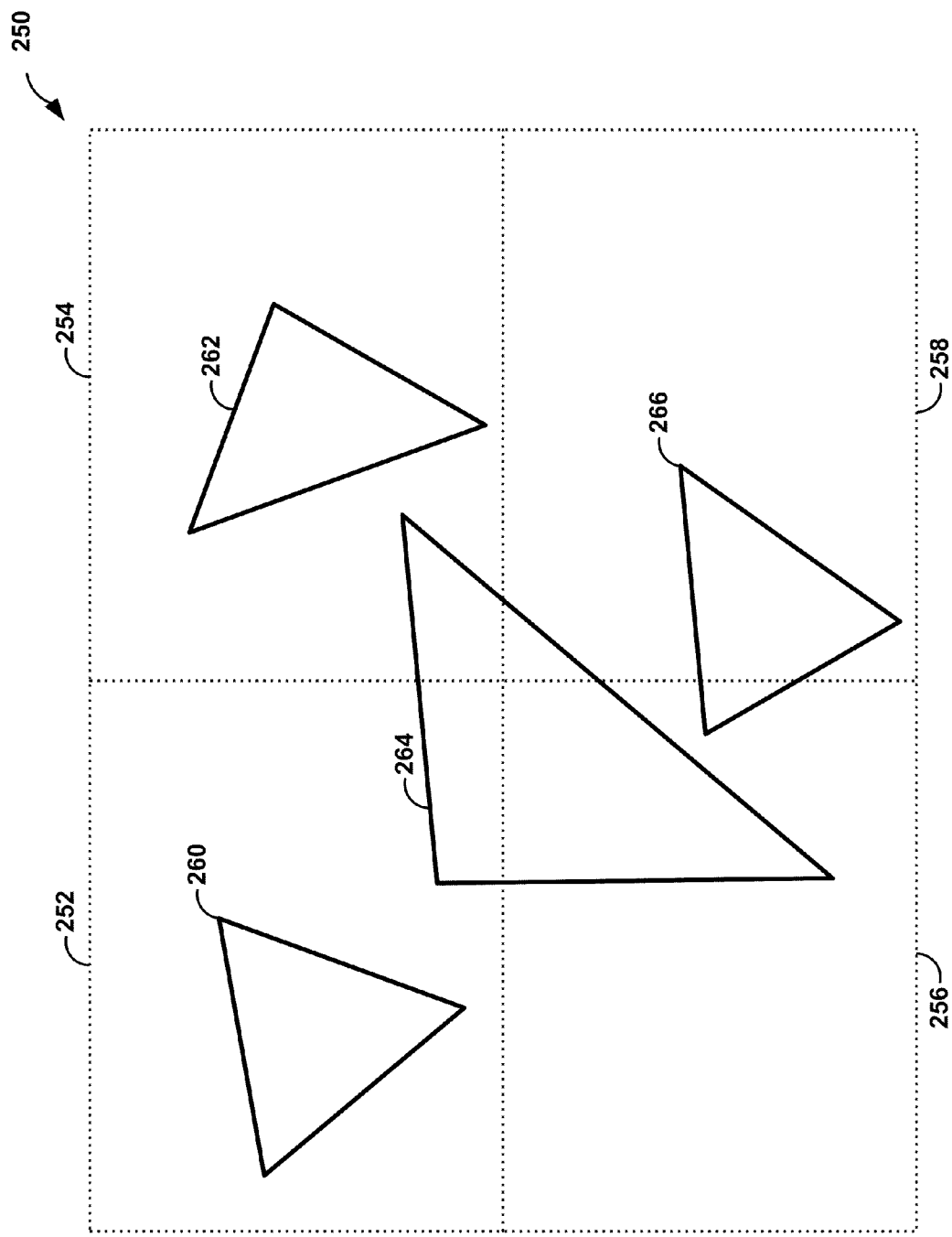
FIG. 10 is a conceptual diagram illustrating an example of graphics data that may span across four partitions of a screen area provided by a display device, according to one aspect of the disclosure.

FIG. 10 is a conceptual diagram illustrating an example of graphics data that may span across four partitions of a screen area 250 provided by a display device, such as display device 6 of graphics device 2 (FIG. 1), display device 24 of application computing device 20, display device 124 of application computing device 40A (FIG. 4B), or display device 201 (FIGS. 8 and 9). For purposes of illustration only, it will be assumed in the following description that the data shown in FIG. 10 is graphically shown on display device 24 of application computing device 20 based upon graphics instructions 30 and state/performance information 32 received from graphics device 2, and also upon mapping/partitioning information 33 received from graphics device 2. The state/performance information 32 may include graphics data for polygons (i.e., geometries) 260, 262, 264, and 266, and mapping/partitioning information 33 may include information for partitions 252, 254, 256, and 258. For example, the mapping/partitioning information 33 received by application computing device 20 may indicate that graphics device 2 uses four distinct partitions, represented by 252, 254, 256, and 258, when rendering graphics data.

In the example of FIG. 10, four binning partitions 252, 254, 256, and 258 are implemented. These partitions represent four corresponding areas within screen area 250 that may be displayed on display device 24. As can be seen in the figure, polygons 260 and 262 are each defined by to be located, or situated, completely within a corresponding partition. Polygon 260 is located within partition 252, and polygon 262 is located within partition 254. When rendering graphics data, graphics processor 12, for example, may render data within each of partitions 252, 254, 256, and 258 separately, and during independent rendering operations. Because polygon 260 is fully within partition 252, it may be rendered as a complete geometry during the rendering operation associated with partition 252. Likewise, because polygon 262 is fully within partition 254, it may be rendered as a complete geometry during the rendering operation associated within partition 254.

On the other hand, polygons 264 and 266 span across multiple partitions. Polygon 264 spans across all four partitions 252, 254, 256, and 258, while polygon 266 spans across two of the partitions 256 and 258. In order to render polygon 264, graphics processor 12 may split polygon 264 into four constituent fragments. Graphics processor 12 may then independently render these fragments during independent rendering operations. After these fragments have been independently rendered, display processor 16 may need to combine the rendered images for each of these fragments in order to display an accurate graphical representation of polygon 264. These separate rendering and combining operations may cause performance overhead.

When an application developer views the information displayed within screen area 250, the developer is able to obtain an idea of which polygons may be split by the hardware because they span across multiple partitions, and also where such partitions are located. The developer may be able to use this information to determine an optimized configuration or location of certain graphics data within a graphics application when defining a scene. In some cases, screen area 250 may highlight or otherwise identify specific portions of the primitive graphics data that are associated with one or more performance issues during instruction execution.

For example, polygons 264 and 266 may be highlighted, or otherwise prominently displayed within screen area 250, to indicate to a user that these particular portions of the graphics data (i.e., these particular polygons) are associated with potential performance issues caused by the fact that these particular polygons span across multiple partitions. As described above, these polygons may be split up for purposes of rendering, and then the rendered fragments may be recombined. These various steps may cause performance overhead that could be minimized or mitigated by moving the polygons, breaking up the polygons, or even deleting the polygons.

For example, upon reviewing the information presented in FIG. 10, the developer may determine to rearrange, or reconfigure, polygons 264 and 266, such that they do not span across multiple partitions. Because the developer is presented with a representation of the partitions that overlay the graphics images within screen area 250, as these partitions are defined by graphics device 2, and because specific portions of the graphics data may be identified or highlighted, the developer may better understand how to define, configure, or locate polygons 264 and 266 such that they do not span across multiple partitions, or such that they span across only a minimal number of partitions. In some cases, the developer may determine to re-define a polygon as sub-polygons, such that they may not need to be combined by display processor 16 after rendering. For example, the developer may re-define polygon 266 in a modified version of application instructions 21 as two separate polygons 266A and 266B. If these polygons are separately defined at the outset, the rendered versions of these polygons may then not need to be combined prior to display, which may reduce performance overhead.

FIG. 11 is a conceptual diagram illustrating texture information within a screen area 270 that may be provided by a display device, such as display device 6 of graphics device 2 (FIG. 1), display device 24 of application computing device 20, display device 124 of application computing device 40A (FIG. 4B), or display device 201 (FIGS. 8 and 9). For purposes of illustration only, it will be assumed in the following description that the data shown in FIG. 11 is graphically shown on display device 124 of application computing device 40A.

Screen area 270 of FIG. 11 shows a graphical representation of primitive graphics data that defines a three-dimensional cube, similar to graphics image 210 shown in FIG. 9. The primitive graphics data may include polygon data, comprising multiple polygons to define the cube's geometries, and may further include texture data that defines one or more textures of the cube. In various cases, textures may add detail to the cube, but, in certain cases, they may be a cause of certain performance issues or overhead. For example, the rendering of an abundance of textures, or complex textures, may cause added processing cycles or overhead. In these cases, it may be helpful for an application developer or artist to be aware of any performance issues, as well as of any portions of the graphics data that are associated with these issues.

In FIG. 11, it is assumed that texture 272 is associated with an identified performance issue. For example, texture 272 may be a large or complex texture. Computing device 40A may receive mapping information from computing device 20 that maps texture 272 to graphics instructions that, when executed, render texture 272, and which are associated with an identified performance issue as a result of such execution. Upon receipt of this mapping information, computing device 40A may display a representation of this portion of the graphics data (i.e., texture 272), such that an artist is capable of identifying the specific texture 272 that is associated with, or potentially a cause of, the performance issue. The artist may then attempt to adjust texture 272 to mitigate or resolve the performance issue.

In one aspect, DCC application 127 of computing device 40A may be used by the artist to create the primitive graphics data associated with the cube shown in FIG. 11, such as within screen area 270. In this aspect, upon receipt of the mapping information, DCC application 127 is capable of identifying texture 272 directly within DCC application 127, such that the artist is capable of viewing and changing the portions of the graphics data (e.g., texture 272) that is associated with the identified performance issue.

The techniques described in this disclosure may be implemented within a general purpose microprocessor, digital signal processor (DSP), application specific integrated circuit (ASIC), field programmable gate array (FPGA), or other equivalent logic devices. Accordingly, the terms "processor" or "controller," as used herein, may refer to any of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware and/or software. Accordingly, the representation of features as components, units or modules is intended to highlight particular functional features for ease of illustration, and does not necessarily require realization of such features by separate hardware or software components. In some cases, various units may be implemented as programmable processes performed by one or more processors.

Any features described herein as modules, devices, or components, including graphics device 100 and/or its constituent components, may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-media applications and devices. In some aspects, for example, such components may form part of a mobile device, such as a wireless communication device handset.

If implemented in software, the techniques may be realized at least in part by a computer-readable medium comprising code with instructions that, when executed by one or more processors, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media.

The techniques additionally, or alternatively, may be realized at least in part by a computer-readable communication medium that carries or communicates code in the form of instructions or data structures and that can be accessed, read, and/or executed by one or more processors. Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Any software that is utilized may be executed by one or more processors, such as one or more DSP's, general purpose microprocessors, ASIC's, FPGA's, or other equivalent integrated or discrete logic circuitry.

Various aspects have been described herein. These and other aspects are within the scope of the following claims.

The invention claimed is:

1. A method comprising:
receiving graphics instructions from an external device;
receiving mapping information from the external device, wherein the mapping information comprises at least one link between one or more graphics instructions within the graphics instructions and associated primitive graphics data that is used to render one or more graphics images during execution of the one or more graphics instructions;
identifying a performance issue associated with execution of at least one graphics instruction within the graphics instructions, wherein the performance issue is associated with overly high processor usage;
using the mapping information to automatically identify a portion of the primitive graphics data that is associated with the at least one graphics instruction that is associated with the performance issue; and
displaying a graphical representation of the identified portion of the primitive graphics data to visually highlight to a user that the identified portion of the primitive graphics data is associated with the performance issue.

2. The method of claim 1, wherein receiving the mapping information comprises receiving the information that maps the at least one graphics instruction to the portion of the primitive graphics data that is used to render one or more graphics images during the execution of the at least one graphics instruction.

3. The method of claim 2, wherein the portion of the primitive graphics data comprises one or more polygons, and wherein using the mapping information comprises identifying the one or more polygons that are associated with the performance issue based upon the execution of the at least one graphics instruction.

4. The method of claim 1, wherein the primitive graphics data comprises at least one of polygon data and texture data that comprise constituent segments of a graphical scene.

5. The method of claim 1, further comprising:
receiving state information from the external device, wherein the state information is associated with the execution of the at least one graphics instruction; and
displaying a representation of the portion of the primitive graphics data that is associated with the performance issue based upon the at least one graphics instruction and the state information.

6. The method of claim 5, wherein the state information includes the primitive graphics data.

7. The method of claim 1, further comprising:
receiving performance information from the external device, wherein the performance information is associated with the execution of the at least one graphics instruction and the portion of the primitive graphics data; and
analyzing the performance information to identify the performance issue associated with the portion of the primitive graphics data.

8. The method of claim 7, further comprising:
receiving user input specifying a requested modification to the portion of the primitive graphics data;
sending the requested modification to the external device for processing;
receiving updated performance information from the external device, wherein the updated performance information is associated with the requested modification; and
analyzing the updated performance information to determine whether the performance issue has been resolved.

9. The method of claim 8, further comprising:
receiving at least one updated graphics instruction from the external device, wherein the at least one updated graphics instruction is associated with the requested modification; and
receiving updated mapping information from the external device, wherein the updated mapping information includes updated information to map the at least one updated graphics instruction to a second portion of the primitive graphics data that is associated with the execution of the at least one updated graphics instruction.

10. The method of claim 1, further comprising:
displaying a representation of the portion of the primitive graphics data that is associated with the performance issue based upon the at least one graphics instruction;
receiving partitioning information from the external device;
displaying a representation of partitions that overlay the portion of the primitive graphics data based on the received partitioning information; and
analyzing the portion of the primitive graphics data to determine whether the portion of the primitive graphics data is associated with multiple ones of the partitions.

11. The method of claim 10, wherein the portion of the primitive graphics data comprises a plurality of triangles, wherein analyzing the portion of the primitive graphics data comprises determining which ones of the triangles span across the multiple ones of the partitions, and wherein the method further comprises displaying a graphical representation of the triangles that span across the multiple ones of the partitions.

12. The method of claim 1, further comprising:
sending the at least one graphics instruction to a second external device;
sending the mapping information to the second external device, wherein the mapping information includes information to map the at least one graphics instruction to the portion of the primitive graphics data; and
sending an indication of the performance issue associated with the portion of the primitive graphics data to the second external device.

13. The method of claim 12, further comprising:
receiving a requested modification to the portion of the primitive graphics data from the second external device;
sending the requested modification to the external device for processing; and
receiving updated performance information from the external device, wherein the updated performance information is associated with the requested modification.

14. The method of claim 13, further comprising:
analyzing the updated performance information to determine whether the performance issue has been resolved; and
sending a second indication to the second external device indicating whether the performance issue has been resolved.

15. A non-transitory computer-readable medium comprising computer-executable instructions for causing one or more processors to:
receive graphics instructions from an external device;
receive mapping information from the external device, wherein the mapping information comprises at least one link between one or more graphics instructions within the graphics instructions and associated primitive graphics data that is used to render one or more graphics images during execution of the graphics instructions;
identify a performance issue associated with execution of at least one graphics instruction within the graphics instructions, wherein the performance issue is associated with overly high processor usage;
use the mapping information to automatically identify a portion of the primitive graphics data that is associated with the at least one graphics instruction that is associated with the performance issue; and
display a graphical representation of the identified portion of the primitive graphics data to visually highlight to a user that the identified portion of the primitive graphics data is associated with the performance issue.

16. The non-transitory computer-readable medium of claim 15, wherein the computer-executable instructions for causing the one or more processors to receive the mapping information comprise computer-executable instructions for causing the one or more processors to receive the information that maps the at least one graphics instruction to the portion of the primitive graphics data that is used to render one or more graphics images during the execution of the at least one graphics instruction.

17. The non-transitory computer-readable medium of claim 16, wherein the portion of the primitive graphics data comprises one or more polygons, and wherein the computer-executable instructions for causing the one or more processors to use the mapping information comprise computer-executable instructions for causing the one or more processors to identify the one or more polygons that are associated with the performance issue based upon the execution of the at least one graphics instruction.

18. The non-transitory computer-readable medium of claim 15, wherein the primitive graphics data comprises at least one of polygon data and texture data that comprise constituent segments of a graphical scene.

19. The non-transitory computer-readable medium of claim 15, further comprising computer-executable instructions for causing the one or more processors to:
receive state information from the external device, wherein the state information is associated with the execution of the at least one graphics instruction; and
display a representation of the portion of the primitive graphics data that is associated with the performance issue based upon the at least one graphics instruction and the state information.

20. The non-transitory computer-readable medium of claim 19, wherein the state information includes the primitive graphics data.

21. The non-transitory computer-readable medium of claim 15, further comprising computer-executable instructions for causing the one or more processors to:
receive performance information from the external device, wherein the performance information is associated with the execution of the at least one graphics instruction and the portion of the primitive graphics data; and
analyze the performance information to identify the performance issue associated with the portion of the primitive graphics data.

22. The non-transitory computer-readable medium of claim 21, further comprising computer-executable instructions for causing the one or more processors to:
receive user input specifying a requested modification to the portion of the primitive graphics data;
send the requested modification to the external device for processing;
receive updated performance information from the external device, wherein the updated performance information is associated with the requested modification; and
analyze the updated performance information to determine whether the performance issue has been resolved.

23. The non-transitory computer-readable medium of claim 22, further comprising computer-executable instructions for causing the one or more processors to:
receive at least one updated graphics instruction from the external device, wherein the at least one updated graphics instruction is associated with the requested modification; and
receive updated mapping information from the external device, wherein the updated mapping information includes updated information to map the at least one updated graphics instruction to a second portion of the primitive graphics data that is associated with the execution of the at least one updated graphics instruction.

24. The non-transitory computer-readable medium of claim 15, further comprising computer-executable instructions for causing the one or more processors to:

display a representation of the portion of the primitive graphics data that is associated with the performance issue based upon the at least one graphics instruction;
receive partitioning information from the external device;
display a representation of partitions that overlay the portion of the primitive graphics data based on the received partitioning information; and
analyze the portion of the primitive graphics data to determine whether the portion of the primitive graphics data is associated with multiple ones of the partitions.

25. The non-transitory computer-readable medium of claim 24, wherein the portion of the primitive graphics data comprises a plurality of triangles, wherein the computer-executable instructions for causing the one or more processors to analyze the portion of the primitive graphics data comprise computer-executable instructions for causing the one or more processors to determine which ones of the triangles span across the multiple ones of the partitions, and wherein the computer-readable medium further comprises computer-executable instructions for causing the one or more processors to:
display a graphical representation of the triangles that span across the multiple ones of the partitions.

26. The non-transitory computer-readable medium of claim 15, further comprising computer-executable instructions for causing the one or more processors to:
send the at least one graphics instruction to a second external device;
send the mapping information to the second external device, wherein the mapping information includes information to map the at least one graphics instruction to the portion of the primitive graphics data; and
send an indication of the performance issue associated with the portion of the primitive graphics data to the second external device.

27. The non-transitory computer-readable medium of claim 26, further comprising computer-executable instructions for causing the one or more processors to:
receive a requested modification to the portion of the primitive graphics data from the second external device;
send the requested modification to the external device for processing; and
receive updated performance information from the external device, wherein the updated performance information is associated with the requested modification.

28. The non-transitory computer-readable medium of claim 27, further comprising computer-executable instructions for causing the one or more processors to:
analyze the updated performance information to determine whether the performance issue has been resolved; and
send a second indication to the second external device indicating whether the performance issue has been resolved.

29. A device comprising:
a display device; and
one or more processors configured to:
receive graphics instructions from an external device;
receive mapping information from the external device, wherein the mapping information comprises at least one link between one or more graphics instructions within the graphics instructions and associated primitive graphics data that is used to render one or more graphics images during execution of the graphics instructions;
identify a performance issue associated with execution of at least one graphics instruction within the graphics instructions, wherein the performance issue is associated with overly high processor usage;
use the mapping information to automatically identify a portion of the primitive graphics data that is associated with the at least one graphics instruction that is associated with the performance issue; and
display a graphical representation of the identified portion of the primitive graphics data to visually highlight to a user that the identified portion of the primitive graphics data is associated with the performance issue.

30. The device of claim 29, wherein the one or more processors are configured to receive the mapping information at least by receiving the information that maps the at least one graphics instruction to the portion of the primitive graphics data that is used to render one or more graphics images during the execution of the at least one graphics instruction.

31. The device of claim 30, wherein the portion of the primitive graphics data comprises one or more polygons, and wherein the one or more processors are configured to use the mapping information at least by identifying the one or more polygons that are associated with the performance issue based upon the execution of the at least one graphics instruction.

32. The device of claim 29, wherein the primitive graphics data comprises at least one of polygon data and texture data that comprise constituent segments of a graphical scene.

33. The device of claim 29, wherein the one or more processors are further configured to receive state information from the external device, wherein the state information is associated with the execution of the at least one graphics instruction, and to display, on the display device, a representation of the portion of the primitive graphics data that is associated with the performance issue based upon the at least one graphics instruction and the state information.

34. The device of claim 33, wherein the state information includes the primitive graphics data.

35. The device of claim 29, wherein the one or more processors are further configured to receive performance information from the external device, wherein the performance information is associated with the execution of the at least one graphics instruction and the portion of the primitive graphics data, and to analyze the performance information to identify the performance issue associated with the portion of the primitive graphics data.

36. The device of claim 35, wherein the one or more processors are further configured to:
receive user input specifying a requested modification to the portion of the primitive graphics data;
send the requested modification to the external device for processing;
receive updated performance information from the external device, wherein the updated performance information is associated with the requested modification; and
analyze the updated performance information to determine whether the performance issue has been resolved.

37. The device of claim 36, wherein the one or more processors are further configured to receive at least one updated graphics instruction from the external device, wherein the at least one updated graphics instruction is associated with the requested modification, and to receive updated mapping information from the external device, wherein the updated mapping information includes updated information to map the at least one updated graphics instruction to a second portion of the primitive graphics data that is associated with the execution of the at least one updated graphics instruction.

38. The device of claim 29, wherein the one or more processors are further configured to:
display, on the display device, a representation of the portion of the primitive graphics data that is associated with the performance issue based upon the at least one graphics instruction;
receive partitioning information from the external device;
display, on the display device, a representation of partitions that overlay the portion of the primitive graphics data based on the received partitioning information; and
analyze the portion of the primitive graphics data to determine whether the portion of the primitive graphics data is associated with multiple ones of the partitions.

39. The device of claim 38, wherein the portion of the primitive graphics data comprises a plurality of triangles, wherein the one or more processors are configured to analyze the portion of the primitive graphics data at least by determining which ones of the triangles span across the multiple ones of the partitions, and wherein the one or more processors are further configured to display a graphical representation of the triangles that span across the multiple ones of the partitions.

40. The device of claim 29, wherein the one or more processors are further configured to:
send the at least one graphics instruction to a second external device;
send the mapping information to the second external device, wherein the mapping information includes information to map the at least one graphics instruction to the portion of the primitive graphics data; and
send an indication of the performance issue associated with the portion of the primitive graphics data to the second external device.

41. The device of claim 40, wherein the one or more processors are further configured to:
receive a requested modification to the portion of the primitive graphics data from the second external device;
send the requested modification to the external device for processing; and
receive updated performance information from the external device, wherein the updated performance information is associated with the requested modification.

42. The device of claim 41, wherein the one or more processors are further configured to analyze the updated performance information to determine whether the performance issue has been resolved, and to send a second indication to the second external device indicating whether the performance issue has been resolved.

43. A device comprising:
means for receiving graphics instructions from an external device;
means for receiving mapping information from the external device, wherein the mapping information comprises at least one link between one or more graphics instructions within the graphics instructions and associated primitive graphics data that is used to render one or more graphics images during execution of the graphics instructions;
means for identifying a performance issue associated with execution of at least one graphics instruction within the graphics instructions, wherein the performance issue is associated with overly high processor usage;
means for using the mapping information to automatically identify a portion of the primitive graphics data that is associated with the at least one graphics instruction that is associated with the performance issue; and
means for displaying a graphical representation of the identified portion of the primitive graphics data to visually highlight to a user that the identified portion of the primitive graphics data is associated with the performance issue.

44. The device of claim 43, wherein the means for receiving the mapping information comprises means for receiving the information that maps the at least one graphics instruction to the portion of the primitive graphics data that is used to render one or more graphics images during the execution of the at least one graphics instruction.

45. The device of claim 44, wherein the portion of the primitive graphics data comprises one or more polygons, and wherein the means for using the mapping information comprises means for identifying the one or more polygons that are associated with the performance issue based upon the execution of the at least one graphics instruction.

46. The device of claim 43, wherein the primitive graphics data comprises at least one of polygon data and texture data that comprise constituent segments of a graphical scene.

47. The device of claim 43, further comprising:
means for receiving state information from the external device, wherein the state information is associated with the execution of the at least one graphics instruction; and
means for displaying a representation of the portion of the primitive graphics data that is associated with the performance issue based upon the at least one graphics instruction and the state information.

48. The device of claim 47, wherein the state information includes the primitive graphics data.

49. The device of claim 43, further comprising:
means for receiving performance information from the external device, wherein the performance information is associated with the execution of the at least one graphics instruction and the portion of the primitive graphics data; and
means for analyzing the performance information to identify the performance issue associated with the portion of the primitive graphics data.

50. The device of claim 49, further comprising:
means for receiving user input specifying a requested modification to the portion of the primitive graphics data;
means for sending the requested modification to the external device for processing;
means for receiving updated performance information from the external device, wherein the updated performance information is associated with the requested modification; and
means for analyzing the updated performance information to determine whether the performance issue has been resolved.

51. The device of claim 50, further comprising:
means for receiving at least one updated graphics instruction from the external device, wherein the at least one updated graphics instruction is associated with the requested modification; and
means for receiving updated mapping information from the external device, wherein the updated mapping information includes updated information to map the at least one updated graphics instruction to a second portion of the primitive graphics data that is associated with the execution of the at least one updated graphics instruction.

52. The device of claim 43, further comprising:

means for displaying a representation of the portion of the primitive graphics data that is associated with the performance issue based upon the at least one graphics instruction;

means for receiving partitioning information from the external device;

means for displaying a representation of partitions that overlay the portion of the primitive graphics data based on the received partitioning information; and means for analyzing the portion of the primitive graphics data to determine whether the portion of the primitive graphics data is associated with multiple ones of the partitions.

53. The device of claim 52, wherein the portion of the primitive graphics data comprises a plurality of triangles, wherein the means for analyzing the portion of the primitive graphics data comprises means for determining which ones of the triangles span across the multiple ones of the partitions, and wherein the device further comprises means for displaying a graphical representation of the triangles that span across the multiple ones of the partitions.

54. The device of claim 43, further comprising:

means for sending the at least one graphics instruction to a second external device;

means for sending the mapping information to the second external device, wherein the mapping information includes information to map the at least one graphics instruction to the portion of the primitive graphics data; and means for sending an indication of the performance issue associated with the portion of the primitive graphics data to the second external device.

55. The device of claim 54, further comprising:

means for receiving a requested modification to the portion of the primitive graphics data from the second external device;

means for sending the requested modification to the external device for processing; and means for receiving updated performance information from the external device, wherein the updated performance information is associated with the requested modification.

56. The device of claim 55, further comprising:

means for analyzing the updated performance information to determine whether the performance issue has been resolved; and means for sending a second indication to the second external device indicating whether the performance issue has been resolved.

* * * * *